United States Patent [19]

Schulze

[11] Patent Number: 5,355,268
[45] Date of Patent: * Oct. 11, 1994

[54] DISK DRIVE KNIFE EDGE PIVOT

[76] Inventor: Dieter M. Schulze, 18956 Sara Park Cir., Saratoga, Calif. 95070

[*] Notice: The portion of the term of this patent subsequent to Feb. 19, 2008 has been disclaimed.

[21] Appl. No.: 966,273

[22] Filed: Oct. 26, 1992

Related U.S. Application Data

[63] Continuation-in-part of Ser. No. 612,204, Nov. 13, 1990.

[51] Int. Cl.⁵ .............. G11B 5/55; G11B 21/08
[52] U.S. Cl. .................. 360/106; 360/104
[58] Field of Search ........... 360/97.01, 99.01, 104–106

[56] References Cited

U.S. PATENT DOCUMENTS

| | | | |
|---|---|---|---|
| 4,819,110 | 4/1989 | Funai et al. | 360/106 |
| 4,835,640 | 5/1989 | Endo et al. | 360/103 |
| 4,845,579 | 7/1989 | Wilkinson, Jr. | 360/106 |
| 4,879,617 | 11/1989 | Sampietro et al. | 360/105 |
| 4,890,176 | 12/1989 | Casey et al. | 360/105 |
| 4,965,684 | 10/1990 | Stefansky | 360/78.12 |
| 4,995,025 | 2/1991 | Schulze | 360/106 |
| 5,003,422 | 3/1991 | Sun et al. | 360/105 |
| 5,041,934 | 8/1991 | Stefansky | 360/106 |
| 5,051,855 | 9/1991 | Ghose et al. | 360/106 |
| 5,105,321 | 4/1992 | Ohkita et al. | 360/106 |
| 5,179,482 | 1/1993 | Taraka et al. | 360/106 |
| 5,235,900 | 8/1993 | Garceau | 92/120 |

FOREIGN PATENT DOCUMENTS 62-145583 6/1987 Japan .................. 360/104

OTHER PUBLICATIONS

Photonics Spectra, Kent Nutt, Sep. 1991, pp. 102–104.

*Primary Examiner*—Stuart S. Levy
*Assistant Examiner*—Jefferson Evans

[57] ABSTRACT

A disk drive with a substantially spaced apart pivot configuration employing Knife Edge type pivot technology, or more specifically, at least one but preferably two contact points with relative movement of pin/cup structures with sliding and/or roll-off motion at contact point forming an axis of rotation and/or with inherently limited rotational range with rotatable confinement of movement along the pivot axis also contributing to either elimination and/or improvement of conventional elements/structures of the disk drive.

73 Claims, 13 Drawing Sheets

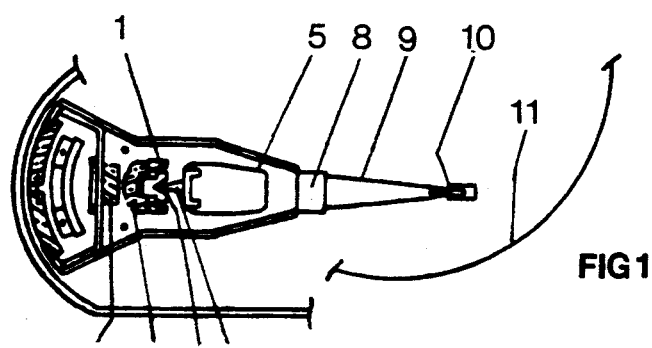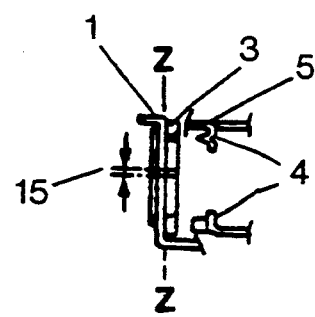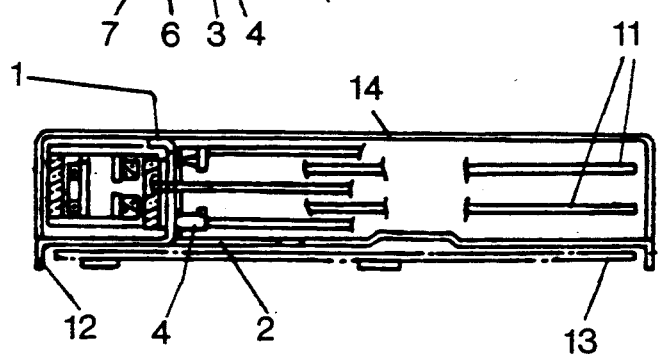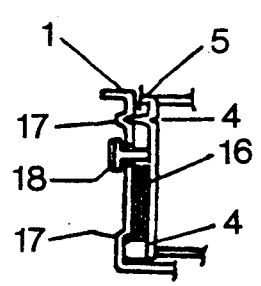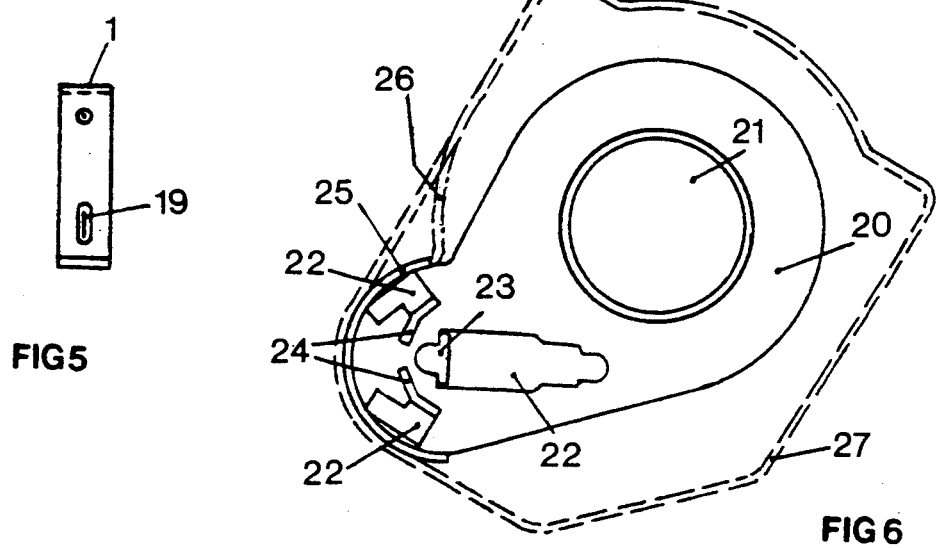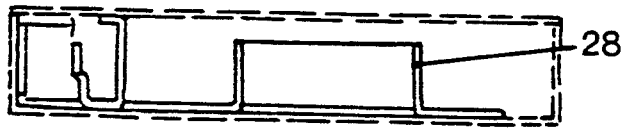

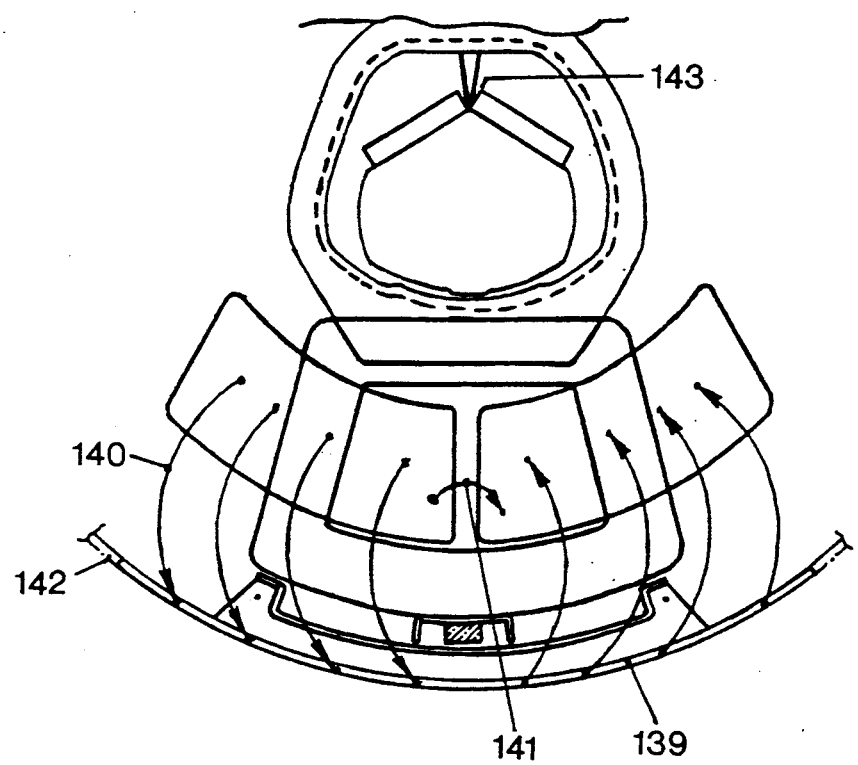
FIG 50
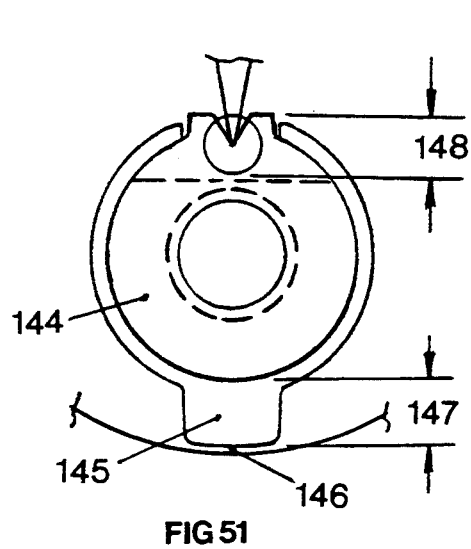
FIG 51
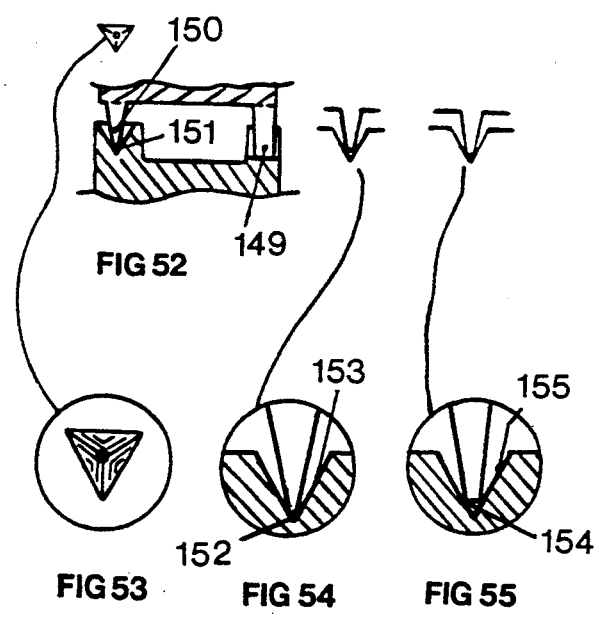
FIG 52
FIG 53  FIG 54  FIG 55

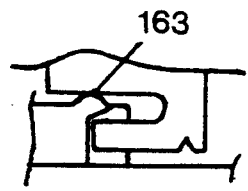
FIG 59
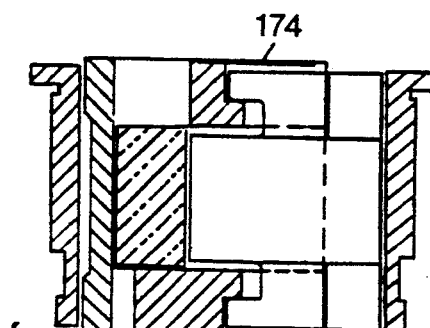
FIG 63
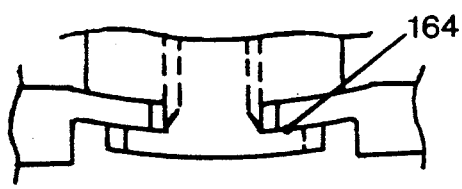
FIG 60
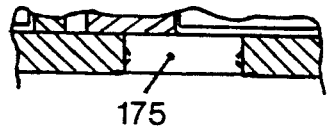
FIG 64
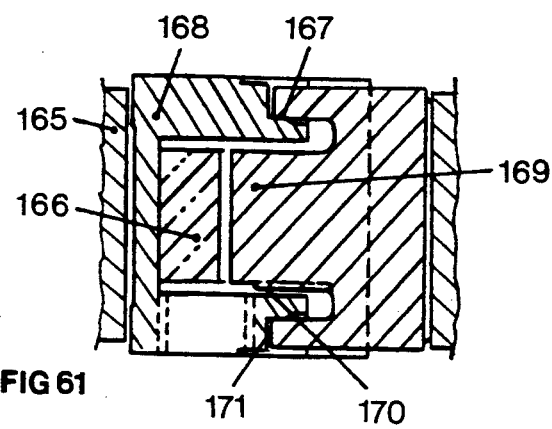
FIG 61
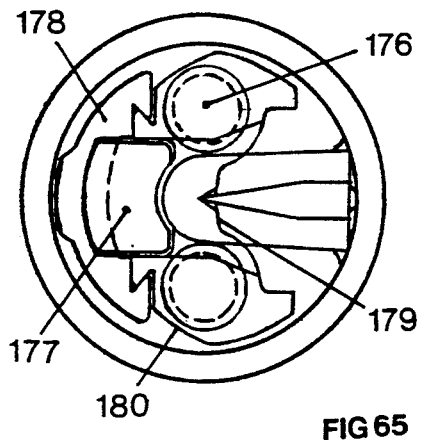
FIG 65
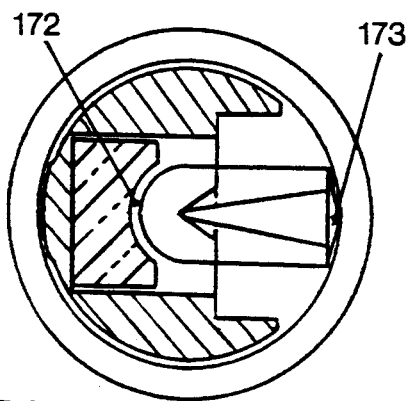
FIG 62
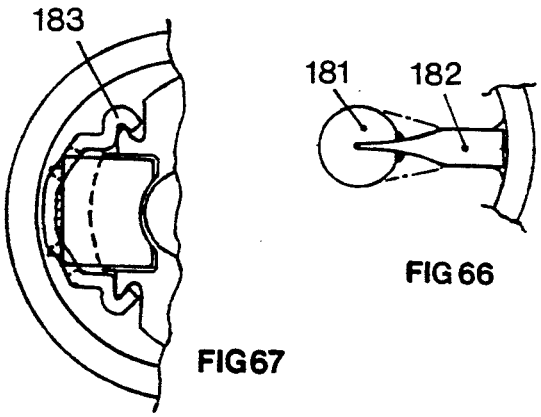
FIG 66
FIG 67

DISK DRIVE KNIFE EDGE PIVOT

This is a continuation-in-part patent application of a copending application Ser. No. 07/612,204, entitled "SMALL ENVELOPE DISK DRIVE" filed Nov. 13, 1990.

BACKGROUND OF INVENTION

The present invention relates primarily to head transducer moving storage devices which, besides "Winchester" type devices, also include similar applications such as floppy disk which may also utilize the Bernoulli concept. The head transducer may be magnetic and/or optical in nature. If optical, the transducer may include invisible wavelength transducing or similar means, but is not limited thereto. The transducer interface may include a substantially fixed distance through the use of flying, viscous and/or contact means.

A large amount of disclosure relating to this invention particularly regarding the pivot technology including inherent partial rotation YAW-AXIS means is referred to in U.S. Pat. No. 4,995,025 Schulze.

Besides a customary spindle as a full turn mover, typically full-turn ball bearings are also used for linear slides and/or rotary pivot means suspending one or more heads and partial turn mover means like voice coils or magnets. Besides being costly, full turn ball bearing pivots also exhibit an undesirable amount of non-repeatable friction.

Ball bearing pivots also require tight tolerances for the interfacing parts. The seating, run-out and evenly distributed preload of the races are of great significance in order to assure proper servo-operation. Essentially two full turn ball bearings with several individual balls are required.

Each ball has at least two contact surfaces and even more when the balls either touch each other or a spacer cage.

In a certain scenario including droppage of a unit, two balls may encounter almost all of the Hertzian or surface stress on at least two convex surfaces, one being the ball and the other the circumference of the inner race, establishing unfavorable stress conditions and also allowing only relatively low stiffness.

The instant invention, by contrast, has substantially at least one but typically two contact areas for each of the two individual pin/cup means if sliding for repeatability is employed.

A convex and a concave interface, but not limited thereto, for lowering of surface tensions or stresses is utilized.

Optionally, the contact areas may be elongated in a direction along the pivot axis.

For typically round recording features like in Optical Recording with only a requirement for having to repeat perhaps a center position, only substantially one contact point per individual pin structure may be required. This rolling motion may also potentially yield the lowest amount of friction. In the abovementioned sliding motion with highest position repeatability requirements due to the elongate shape and accordingly tight skew requirements of the recording features, only typically two contact points/lines with only minute friction torque radii may generate perhaps a slightly higher amount of friction compared to rolling motion. In the context of this invention, these two contact points/lines per individual pin/cup shall be termed as one contact point. However, for full turn ball bearings, several balls are being used. First, the balls generate a sliding friction torque about their own radii when perhaps most contact each other or a spacer cage. Second, additional friction torque is generated by a much larger radius from the center of the bearing to the center of the individual balls including rolling motion and translated sliding motion. Besides other aspects, the friction torque for full turn ball bearings is typically higher. Depending on preload alignment of those ball bearings and/or head pair preload difference, the individual balls may aggregate on one side and generate a torque of a magnitude which voice coils particularly of smaller drives could not overcome. Especially here, distinction is also made between static and dynamic friction. In perspective, radii for the instant invention could progress down to about a thousands of an inch, but not limited thereto, while such functional radii for full turn ball bearings could be about several orders of magnitude higher. It is also shown that contactless magnetic preloading is very repeatable and can also accommodate for bias torques if needed. In ball bearings, by contrast, the balls can move around versus their original position and may or may not make contact in certain circumstances including reversal of direction besides others, generating non-repeatable friction. A high amount of friction also increases the dead-band. In the presence of an undesirably large dead-band, a higher amount of voice coil power has to be applied to overcome such friction before movement of the arm structure can occur. A low dead-band facilitates higher precision of the servo-operation.

The state of the art with full turn ball bearing pivots employs plane versus projected sheet-metal of the instant invention and also has a pivot housing as an integral portion of the deck means. However, such integral portion does not provide ferro-magnetic loop means as the instant invention may provide.

SUMMARY OF INVENTION

The present invention involves an inherently partial turn pivot with preferably two spaced apart substantially individual contact points forming the pivot axis, also providing for registration along said axis.

Since only a limited operating range is required for this application, less costly but also more functional embodiments can be devised. The concept may lend itself to improved functional features including lower friction, lower bias, better repeatability, lower dead-band, higher stiffness and higher shock capabilities, but not limited thereto.

In contrast, conventional pivots using full turn ball bearing means could be rotated full turn if no stops were used as well as partial turn. Their inherent design is not for partial turn or rotation only. However, since only partial turn movement is required, the full turn capability of full turn ball bearings being costlier and/or less functional appears excessive.

Particularly with the application of inherently partial turn pivots of the instant invention, certain conventional functional structures/elements may be integrated or be an integral portion of other such structures/elements for the elimination of parts. Certain of these structures/elements will serve at least one more function than the state of the art. Some of the combinations, however, may also apply to conventional full turn ball bearings and/or compactness of the unit.

Besides conventional choices of materials/processes like aluminum, magnesium, cast and machining etc., projected sheet-metal, powder-metallurgy and/or ceramics and others including for example silicon carbide for structure/element/pivot may be used, but not limited thereto. A variety of bearing materials/surface/substrate augmentations are in the public domain.

BRIEF DESCRIPTION OF THE DRAWINGS

FIG. 1 shows a top view of one embodiment of the instant invention;

FIG. 2 shows a front sectional view of FIG. 1 also showing two pins of spaced apart pivot means;

FIG. 3 shows a pivot configuration with inserts for the cups;

FIG. 4 shows a pivot configuration with integral cups, preload magnet pair and separation stop;

FIG. 5 is a side view of a deck pivot structure means;

FIG. 6 shows a ferro-magnetic deck insert and housing;

FIG. 7 is a cross-sectional side view of FIG. 6;

FIG. 50 shows extension into permeable loop/seal means;

FIG. 51 shows an integral deck pivot and cup structure and detachable stop means;

FIG. 52 shows a portion of integral pin/cup means including registration along the pivot axis;

FIG. 53 shows an enlarged view into a cup means also for registration along the pivot axis emphasizing a pyramid shape;

FIG. 54 shows an enlarged view of a slightly rounded pin and flat cup surfaces;

FIG. 55 shows an enlarged view of a pin interface with a small flat surface;

FIG. 59 shows a vertical registration feature;

FIG. 60 shows a spherical alignment/assembly means for deck/pivot;

FIG. 61 shows a stationary preload magnet configuration wherein the pins-structure interfaces to a substantially round arms structure interface;

FIG. 62 shows a top view of FIG. 61;

FIG. 63 shows a cross-sectional side view of FIG. 65;

FIG. 64 shows a deck interface projection in the center of the pivot axis;

FIG. 65 shows a removable preload/stop arrangement;

FIG. 66 shows pins-structure allowing a wider operating range;

FIG. 67 shows a detachable preload magnet/stops configuration allowing spring action;

DESCRIPTION OF THE PREFERRED EMBODIMENT

Figure 8:
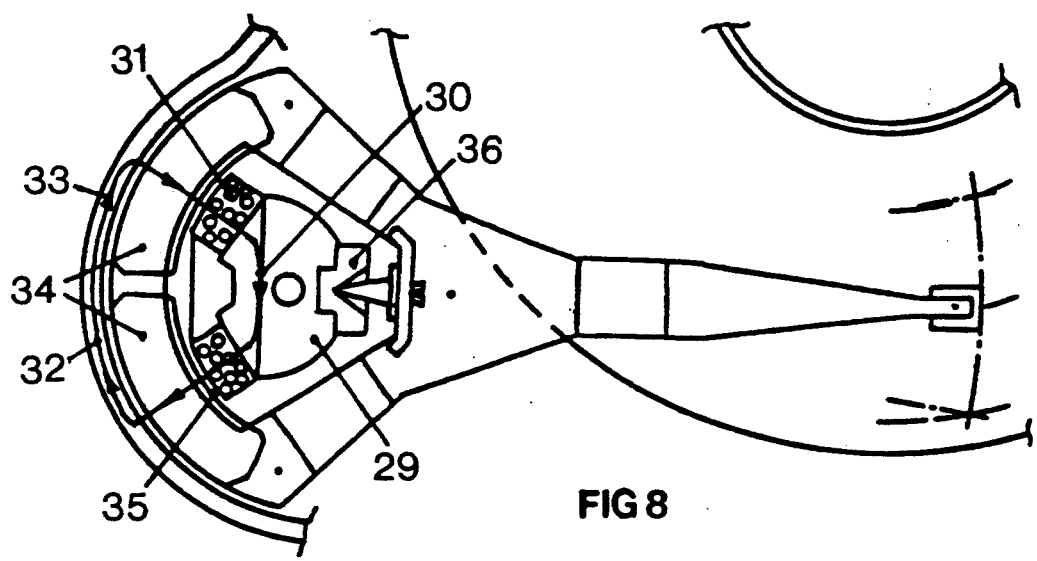
FIG. 8 shows a top view of the actuator including the magnetic loop and employing sheet-metal arm parts.

FIG. 1 shows an implementation of the instant invention. There are essentially two pivot structure means, such as projecting members and/or recessed portions, whose interaction may form a pivot means. One is associated with a movable arm structure, another with a deck. The deck is a structure which typically accommodates the functional elements in order to form a spacial relationship and/or facilitate data storage and/or retrieval with media means. The deck pivot structure means 1 is a stamped and bent up portion of the deck, leaving an opening 2 in the deck. A cup 3 is inserted into or is an integral portion of this deck pivot structure means. The pins 4, which are also of compatible bearing-material to interface with said cup, are attached or are an integral portion of a stamped and bent down portion of a head/pivot/partial turn mover structure or also called arm structure/assembly 5. The cups/pins are of suitable bearing materials including metals, ceramics, plastics and others in the public domain, but not limited thereto. Cutting tool steel may be a choice. The magnet 6 is part of a preload implementation for the pivot and is attached or integrated to the deck pivot structure means. The magnet 7 is attached to structure 5. The magnets repel each other so that cup 3 and pins 4 are pulled together. The gimbal mount 8 of structure 5 provides a mounting surface for gimbal 9 of head 10. The disk 11 is the media for data storage and/or retrieval interfacing with head 10.

FIG. 2 shows a sectional view of FIG. 1. On deck 12 are also mounted a spindle with disk means 11, printed circuit board or equivalent 13 and perhaps a sealed cover 14.

FIG. 3 shows the deck pivot structure means 1 with cup arrangement 3 inserted. The separation 15 may aid thermal matching requirements. The expansion/contraction is now generated or controlled by both pivot structure means and potential displacement at the interfacing contact points and/or surfaces of the pin/cup assemblies are minimized. For the same reason and to accommodate for tolerances, the lower pin of pin arrangement 4 is shorter than the interfacing cup groove of FIG. 5 leaving clearance on both sides. The upper and lower pin/cup implementations may be reversed. The optional elongation of said lower pin 4 is for lowering of surface tension. The lower pin/cup together with the upper pin/cup contact points/lines/surfaces establishes an axis about which relative motion between the pin/cup, i.e. pivot, structures describing inherently partial turn rotation may occur.

A perfect substantially one contact/surface pivot is theoretically feasible, however, impractical but in the context of this invention shall be included. The upper pin provides also rotatable/vertical registration control for confinement of movement to substantially within micro-inches along the pivots axis and its cup interface/surface/cone orientation can be favored by slanting. These confines of micro-inches may range from zero to about a few hundred, but not limited thereto. They are to be considered allowing substantially zero movement.

If more cup strength, as example, in the vertical registration direction is desired, the angle in reference to the cup center-line in this direction could be made smaller than in its operational orthogonal direction.

The pin/cup configuration is substantially cone shaped which may include the slight rounding of the pin-tip and/or cup groove, the perhaps funnel, step, pyramid with straight/curved surfaces, elongated and/or linear or similar cup shape of its ascending surfaces among others. An angle of such cone is larger for a cup than for a pin.

Certain applications, among them ones with light preload, may not require an actual cone shape and the pin/cup interface may consist of minute roundings only.

The pin may consist of a cylinder with a rounded end and may also have a larger cross-section and may include ferro-magnetic material to interact with a magnet to exert preload. A rotatable, eccentric ring may adjust for bias. These and similar configurations shall be included in the term cone-shaped. The lower cup segment may be slightly floating.

Jewel bearings are well established in the prior art and they are typically not inherently limited in their rotational range. The axis establishing surface in a contact area by definition shall be deemed to be one surface, even if perhaps two high spots are contacted including perhaps on a journal, or elongated pin/cup arrangements have substantially two line-like contacts or lubrication reservoirs and/or striae may interrupt the integrity of such surface or the cup configuration may consist of split portions and the like. The term jewel bearing shall not be limited to any particular material selection for its implementation. For a journal type application, micro particles in ferro-fluids may find application as lubricant and/or potential wear particle receptor/containment, but not limited thereto.

A free end perhaps with a distance to media may be used for certain applications including focused beam technology like in Optical Recording.

The free end shall also denote such head. Parallel head transducer means may be used.

The term data shall include digital and/or analog storage/retrieval.

FIG. 4 shows the deck pivot structure means 1 with integral coined cups 17 arrangement, separation stop 18 and preload magnet arrangement 16, here attracting. In the context of this disclosure, attracting shall also mean repelling.

One magnet may suffice. Favorable placement of arrangement 16 will reduce surface tensions.

FIG. 5 is a side view of the deck pivot structure means 1. Groove 19 of the lower cup means shows an elongation. A conventional unit with a horizontal, also called flat, coil configuration would require typically more length beyond the mandatory disk space while here a vertical coil requires only a smaller envelope. Horizontal/flat coils may yield the benefit of a lower height of the unit. In general, any suitable material and-/or processes including aluminum, stainless steel, tool steel including cutting tool steel, ceramics including for example silicon carbide, alumina, zirconia (perhaps conductive), surface/substrate augmentation, hard chrome, hard nickel, case hardening, diamondizing, "NYE-CARB" from Electro Coatings Inc., cast, hot/cold heading, drawing, stamping, fine blanking, coining, machining, bending, welding, projected sheet-metal/-reinforcement, extrusion, ferro-magnetic/non-magnetic, powder-metallurgy, investment cast, centrifugal cast, isolation pads, but not limited thereto, could potentially find application. The term bearing materials in the context of this invention shall mean any materials, constituents and/or combinations suitable to be used in any embodiment of at least the pivots pin/cup combination for any particular application. Out of numerous references other examples could be found in Machinery's Handbook for cutting tool steels perhaps with inherent lubrication properties, surface facings or generally surface/substrate augmentations, perhaps selective, carbides (metallic/non-metallic), or Materials Handbook for ceramics, mostly for refractories, such as silicon carbides among others. The term ceramics in the context of the instant invention shall also include glasses, refractories, diamond, carbides, CERMETS, powders, suspending matrixes, even highly filled plastics/epoxies and the like where applicable in contrast to metals. Lubrication may be external and/or internal.

From Electro Coatings Inc., as again in the public domain, some data are given for hardness/friction relationships for bearing materials/facings which may have relevance for the performance of the pivot.

Hardness: Diamond, Knoop 7000; Silicon carbide 2500; Hard Chrome 972 (Rockwell $R_c$ 70); Hardened Tool Steel 822 ($R_c$ 64); Electro-less nickel 542 ($R_c$ 50) could, however, be hardened to $R_c$ 70 by heat treatment, temperature involved will have no effect on diamond, FERRO-TIC, ATI, $R_c$ 68–71. Coefficient of friction: Diamondizing vs. hardened tool steel 0.07–0.10; Chrome vs. Steel 0.19–0.23; Electo-less nickel vs. Steel 0.21–0.38. These data show some relationship between hardness and friction, however, the toughness or brittleness and/or the inherent damping and/or stiffness as well as specific weight and cost of the particular material have to be reconciled with the application.

Further, the arrangement has similarity to Knife-Edge Pivots, however, some trade-offs between friction and the induced dead-band and surface tension and possible wear has to be considered. It may also be feasible to either include magnetic material into the cups and use nickel coated iron or ferro-magnetic pins thus generating the preload. The pins may be integral or integrated like staked, brazed or similarly attached into structure 5. The partial turn mover means could employ conventional means including a flat coil configuration. The stop means could be an integral portion or be integrable with the arms structure, voice coil, magnet or the deck structure or both.

It can be shown that reasonable dimensions for the particular components can be achieved while the drive could also accommodate disk dimensions on the low end like 1.8 or 1.3 inch diameter or even smaller.

The term deck shall also include cover and/or housing and/or deck insert means. A tube like structure, see also FIG. 45, including flat sides may be integral with both deck and cover and serving as housing and/or seal and at least two functions. The tube like structure may have magnets and/or additional permeable loop and stop etc. means assembled, be integrated by bonding before pivot and spindle get assembled. Any further sealing may be confined to only one end of the unit possibly including a connector end.

The openings in the deck may be covered with pierce resistant material or suitable insert/cover means. The vertical bent up portions could be integrated or be an integral portion of an insert which in turn may be integrated into a housing which may be of plastic and/or aluminum and/or ceramics or other suitable materials/-processes such as sheet-metal. A configuration like in FIGS. 6/7 could also be expanded into an embodiment wherein powder-metallurgy is used encompassing permeable loop/pivot and/or portion of full-turn mover as well. The embodiment also lends itself to other processes. Other possibilities for the selection of means for the immediate contacts for pins/cups and/or dead-stop means and/or vertical registration may include at least surface augmentations like for example synergistic coatings from Magna-Plate. Magna-Plate synergistic coatings from General Magna-Plate Corporation provide a harder than steel, slippery (i.e. low friction) surface that improves wear and performance. The coatings lengthen wear life by increasing surface hardness to $R_c$ 85. They also give the metal part a dry lubricated, slippery surface at the same time.

These permanent, abrasion and corrosion resistant coatings become an integral part of the base metal, and would not chip/peel or rub off.

Or salt bath nitriding for improvement of wear characteristics. Kolene Corporation.

Or the selective laser sintering process from DTM Corporation, see also Photonics/Spectra magazine, September 1991, pages 102–104.

The potential choices are many and only a few are mentioned in the instant application.

Bearing materials and the general discipline of Tribology cover many Engineering aspects and only a few references are given for practical reasons.

FIG. 6 shows a permeable insert 20 into housing 27, whose material may be aluminum, plastic, ceramics and/or other suitable means. The opening 21 is for the assembly of a full turn mover like a spindle motor. A configuration may be devised which also utilizes insert 20 as a functional part of a spindle motor by means of a drawn up ring 28 of FIG. 7 or similar, thus reducing motor cost and/or tolerance build-up. The openings 22 are created by bent up pivot structure means 23 and permeable loop element 24. The deep drawn portion 25 closes the magnetic loop and interfaces with fixed or movable magnets. The drawn up portion 26 is only shown as the shape when the entire bowl or deck including part of the probable housing is also of permeable material including sheet-metal. The housing may essentially interface either on the top or on the bottom as shown. The insert/housing or portions thereof may also perhaps be devised by powder-metallurgy with ferro-magnetic material, with permeable loop 24 and pivot structure 23 being one integral or integrable structure or element, see also FIGS. 37 and 38.

FIG. 7 is a side view of FIG. 6 also showing the insert and potential housing.

FIG. 8 shows an implementation wherein the pivot-/yoke structure 29 may also be integrable, i.e. attachable/removable and/or permanently affixable either to or from the deck and/or insert, but also provides for a permeable portion 30 of the magnetic loop for the voice coil arrangement. Either fixed or movable, the voice coil 31 is shaped in order to accommodate the shapes for the interfacing elements as yoke and magnet and to shorten the air gaps for efficiency of the magnetic loop. Particularly the interfacing surfaces may be straight or curved. This voice coil 31, two cups and/or pins or equivalent and a preload interface, perhaps a small cylinder or magnet are either mounted or are an integral portion of said structure 29. This structure is thus multi-functional and besides more conventional means may lend itself for powder-metallurgy manufacture. The cups/pins may also be integral with either deck or arms pivot structure. Also shown is a flux path 32, whose direction 33 could also be reversed, which may be very efficient indicated by the shortness of the average flux line. A relatively large cross-section also for the flux may be provided.

Since perhaps the coated magnets 34 to voice coil distance or air gap 35 may typically be smaller than the pin to cup separation distance 36, no separate dead-stop may be needed especially for smaller units.

Figure 9:
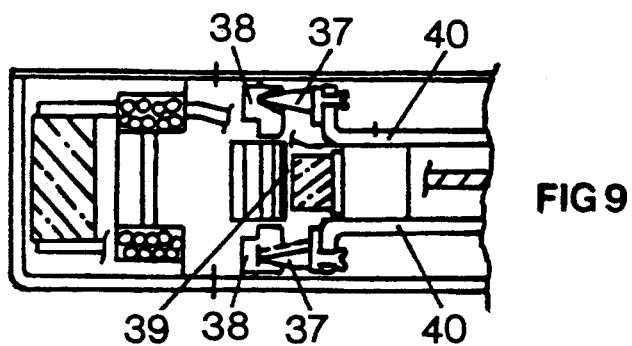
FIG. 9 shows a partial side view of FIG. 8 also displaying dual pin pivot, voice coil and preload means for one disk.

FIG. 9 is a side view of FIG. 8 showing the pins 37, cups 38, preload arrangement 39 and sheet-metal arms 40, which may perhaps be essentially flat substrates of aluminum, stainless steel, ceramics, plastics or other suitable means.

The substrates could be reinforced by projections or other means.

The gimbal and arm extension may be integral.

Figure 10:
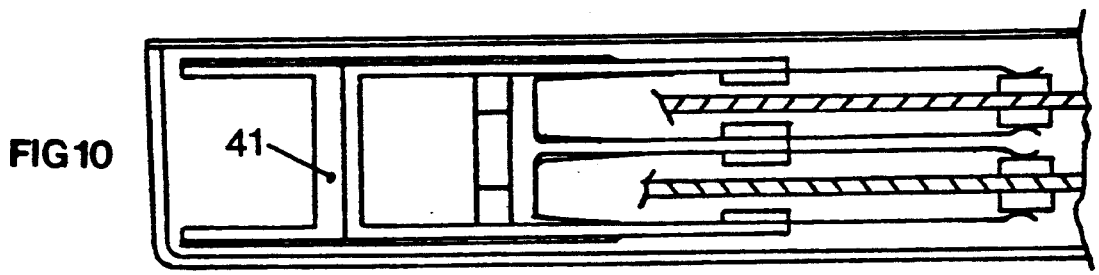
FIG. 10 shows a side view of a one part or integral casting for a two disk arrangement.

FIG. 10 shows a side view with a cast integral arm arrangement 41, heads, disks and housing.

Figure 11:
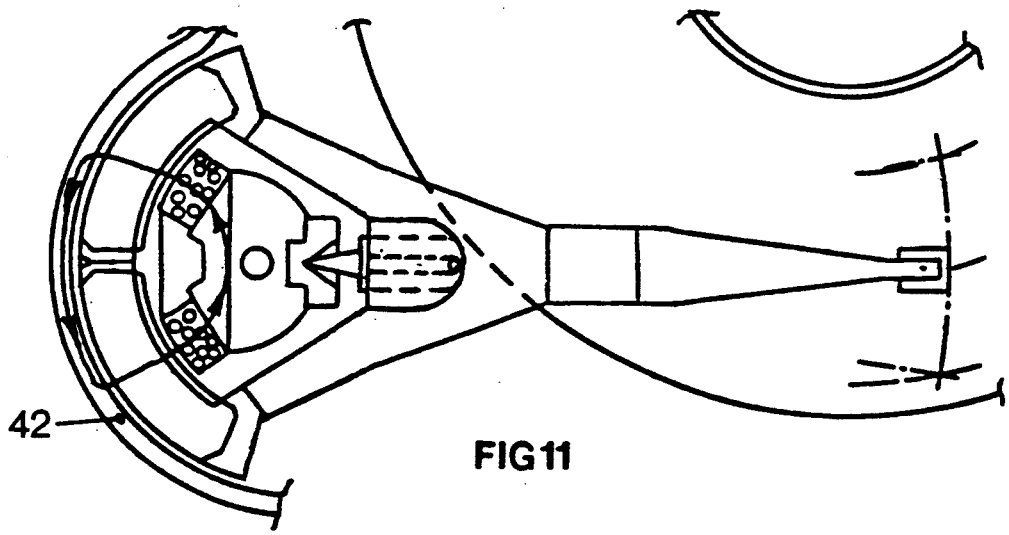
FIG. 11 shows a top view for the arrangement of FIG. 10.

FIG. 11 shows a top view also for an integral arm arrangement of FIG. 10. Due to its relatively large cross-section perhaps also extending into the flat portion of the deck and/or insert, the permeable portion 42 may possibly be of relatively thin sheet stock.

Figure 12:
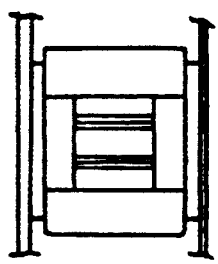
FIG. 12 shows in essence a side view of FIG. 11 displaying the voice coil.

FIG. 12 shows a side view including the voice coil mounted to said multi-functional element.

Figure 13:
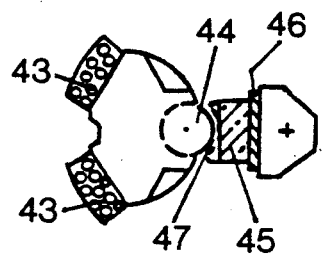
FIG. 13 shows a cross-sectional view of a multi-functional element including pivot structure, integrated voice coil, permeable loop and portion of preload means.

FIG. 13 shows a cross-section about near the center of said element accommodating at least pivot, yoke, coil mounting structures and preload functions, displaying the voice coils active legs 43, a pivot preload arrangement with permeable pin means 44 either integrated and/or integral, magnet 45 and optional permeable adjustment plate 46. Again, the placement of cylinder or magnet on either deck or arm pivot structure may be reversed. The air gap 47 provides contact-less force exertion for high repeatability. The effective force direction of the magnet should ideally go through the axis formed by the two pivot centers in order to achieve a nearly zero bias torque.

In movable magnet configurations for the partial turn like voice coil mover, the attraction of the magnets to the deck means may also provide pivot preload means due to a shorter air gap. A bias reduction/elimination may be accomplished by either magnet alignment or addition of slugs or equivalent which may be magnetic and/or ferro-magnetic.

Figure 14:
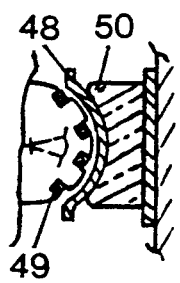
FIG. 14 shows a cross-sectional view including controllable bias and/or preload means for preload arrangement.

FIG. 14 shows a controllable bias means including adjustment plate, magnet 50, optional distribution element 48 and coils 49 preferably arranged symmetrically about the force direction of the assembly. The rounding of the magnet may also be optional.

The coils 49 could either individually, differentially or in tandem shift the aggregate center of the flux thus effectively controlling the bias torque. They could also provide preload depending on size, however, the bias torque is typically small.

The servo could compensate for the bias torque, however, under certain conditions, it may prove favorable for the operation of the servo to have as low a bias torque as possible to achieve highest precision and/or response. One of the coils may suffice, perhaps arranged slightly off center.

Figure 15:
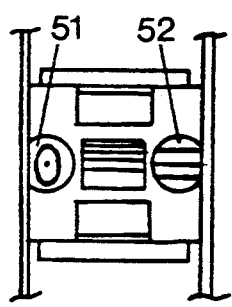
FIG. 15 shows a side view of multi-functional element of FIG. 13 displaying both cups and a pin means for a preload arrangement.

FIG. 15 shows a side view displaying essentially the pivot cups 51/52. The cup 51 interface has an oval shape favoring strength in the direction of the pivot arrangements axis. This may optionally be devised since cup 52 provides only frictional force in this direction.

The cup 52 has an elongated groove.

The spacial relationship of the pin/cup configuration will substantially stay repeatably within the confines of micro-inches for any particular position. This may include the minute thermal variations, potential roll-off of pin/cup, potential sliding movement between pin/cup, minute potential displacements generated by damping, the control/prevention of movement along the axis and other associated phenomena. At least one further contacting surface may be required for prevention of said movement.

Figure 16:
FIG. 16 shows a cup implementation with partially elongated groove.

FIG. 16 is similar to cup 51, however, an elongated groove of limited length was added. The elongation of the groove is devised to compensate for tolerances and assure definite, repeatable position. For control of motion along the axis, precision fitting may be required. The cups and/or preload cylinder may be integral with the deck pivot structure.

This fitting/confinement may substantially be facilitated by means of a spring force/dead-stop, a zero or slight deliberate clearance. Both are to be considered allowing substantially zero movement.

Figure 17:
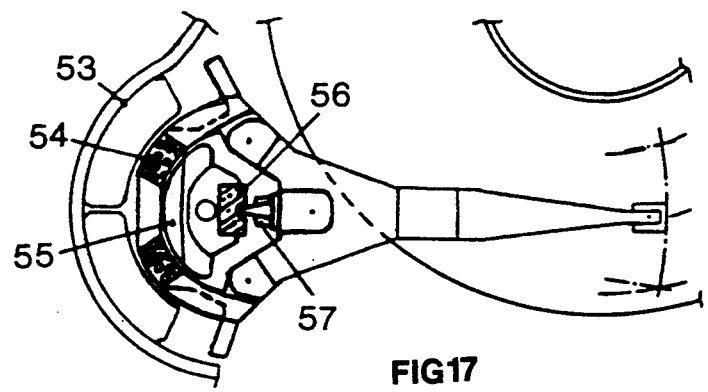
FIG. 17 shows a movable voice coil and magnetic preload configuration.

FIG. 17 shows a configuration with a movable voice coil 54 and with the stationary magnet attached to the ferro-magnetic deck/insert. A thin glue line assures that the gap 53 is as short as possible. The voice coil portion 55 may be rounded to allow vertical mounting. The magnet insert 56 is coated with wear resistant means interfacing with the pin which may be of a highly ferro-magnetic substrate, hard chrome/nickel coated or other suitable material and providing more bulk 57 to serve the preload function. As example, a rotatable, integrable ring or clamp arranged about the center may correct for bias.

Figure 18:
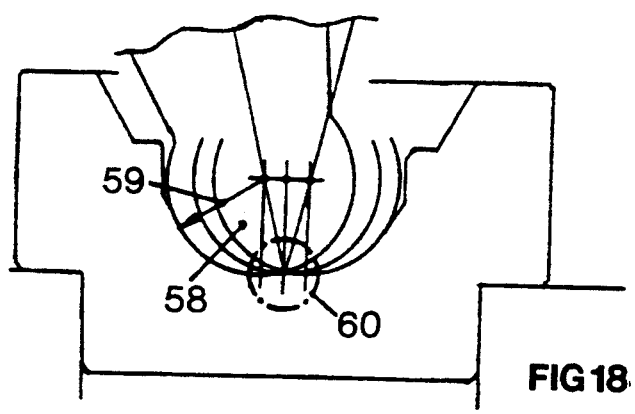
FIG. 18 shows roll-off motion at pin/cup interface.
Figure 19:
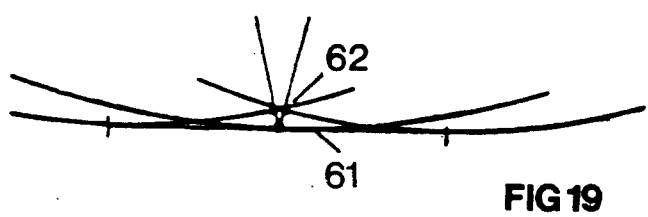
FIG. 19 shows an enlarged view with flat roll-off surface.
Figure 20:
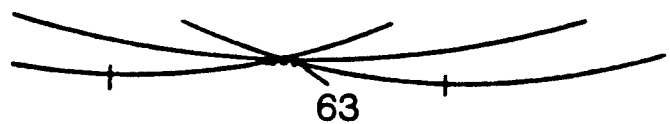
FIG. 20 shows an enlarged view with elevated roll-off surface.
Figure 21:
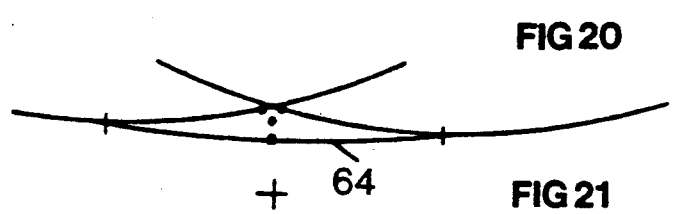
FIG. 21 shows an enlarged view with lowered, blended-in roll-off surface.

FIG. 18 shows a pivot with roll-off motion for lower friction. A pin tip 58 is rounded with radius 59 while the centers of rotation 60 are shown in enlarged views of FIGS. 19, 20 and 21. Roll-off surface 61 with rotation centers 62 is flat, surface 63 is elevated and surface 64 is a blended in curve providing a smooth transition with the outer surfaces.

Figure 22:
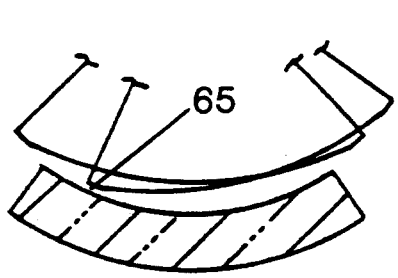
FIG. 22 shows a preload arrangement for vertical force exertion at the instant contact point/line.

FIG. 22 shows a preload arrangement facilitating a direction and/or highest magnitude force normal, i.e. vertical to the instant contacting surfaces eliminating side components in order to control tangential offset of the Read/Write gap of the head. The short air gap 65 assures a higher torque at this location.

Figure 23:
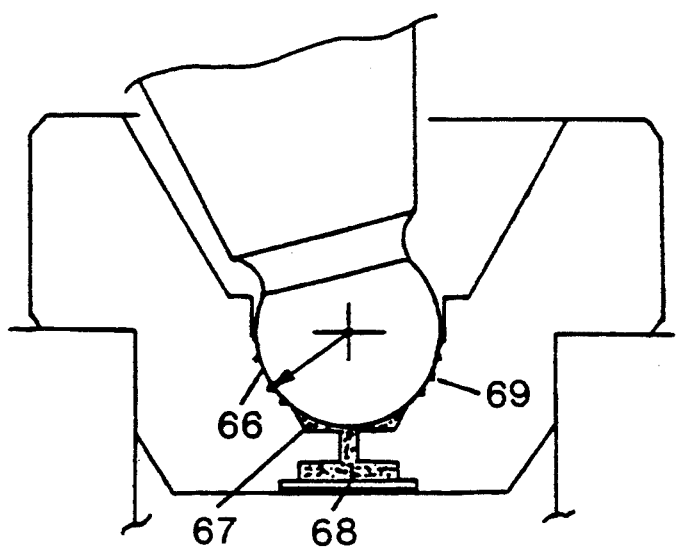
FIG. 23 shows a sliding pivot arrangement.

FIG. 23 shows a pivot with sliding motion of surfaces 66 and the center of rotation is at the center of the pin-tip. The tip may perhaps also have a small flat and the cup may have a pyramid shape for positive registration. A potential lubrication reservoir 67 may be extended into a retainer 68 for a larger supply of lubrication means. The pin-tip radius can be extremely small providing for a rather low friction torque. The striae 69 can be arranged so that any contacting area of the pin-tip on surfaces 66 will either at least reach and/or traverse said striae to assure lubrication action over the operating range. A proper lay-out of the striae arrangement may generate some pumping action to aid lubrication, but is not limited thereto. The channels may be interrupted and various arrangements are feasible.

Figure 25:
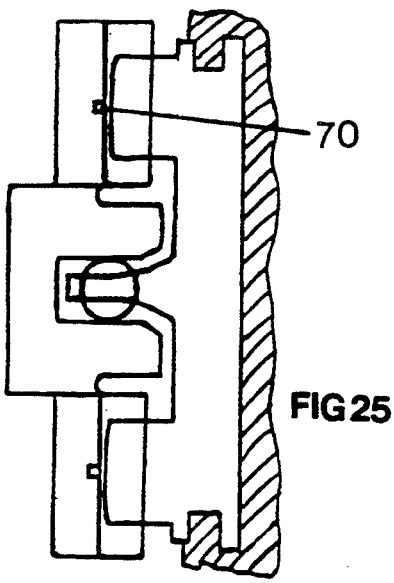
FIG. 25 shows a vertical registration with an elongated pins arrangement.
Figure 24:
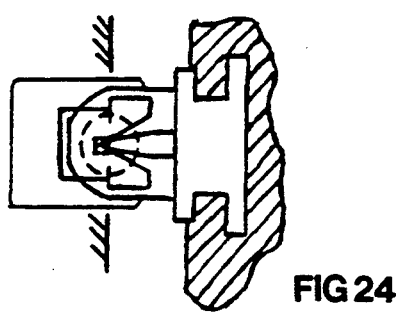
FIG. 24 shows a side view of FIG. 25.

FIG. 24 is a top view of FIG. 25.

FIG. 25 shows a vertical registration means with an elongated pins arrangement, also shown is a tiny lubrication reservoir 70.

Figure 26:
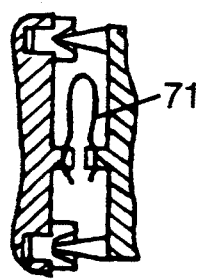
FIG. 26 shows a mechanical spring preload arrangement.

FIG. 26 shows one embodiment of a preload arrangement with mechanical spring means. However, it is pointed out that magnetic preload means also exert a spring force.

Figure 27:
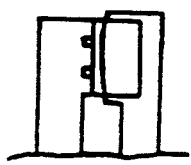
FIG. 27 shows one elongated cup/pin interface.

FIG. 27 shows one elongated pin/cup interface similar to FIG. 25.

Figure 28:
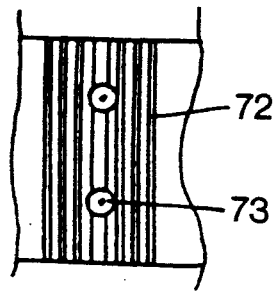
FIG. 28 shows striae and lubrication reservoirs at the immediate contact area.

FIG. 28 shows an optional interface of the contacting area of FIG. 27. Striae 72 and lubrication reservoir 73 may contain lubrication means.

Figure 29:
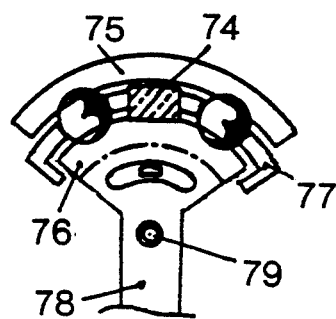
FIG. 29 shows a two ball partial circumference pivot portion/implement.

FIG. 29 shows a portion of a partial circumference ball bearing pivot including two balls. A preload magnet 74, which is affixed to partial inner ring 76, interacts with partial outer ring 75 which is affixed to a deck means. A partial ball spacer ring 77 or cage is floating. The cage may be devised for relative movement in reference to the ball races 75/76. The dead-stop means 79 is arranged about the pivots center of rotation or perhaps closer to the bearing arrangement. This configuration has an inherently limited rotational range and allows for placement of the center close to, if not in the vicinity of, the disk enabling a compact unit and/or consistent operating conditions. A reduction in sliding action of ball/cage may also be achievable by such magnetic means. The implement as shown can be expanded into an axis forming pivot similar to a double row ball bearing with at least one more ball. Also, two vertically arranged balls may be expanded by at least a third ball including additional race means, besides other approaches. The term ball bearing shall also include roller bearings. The arrangement also allows now for improved or lower Hertzian stress levels, bias and/or friction optimization within a given space constraint. Also, the motion translation provides for a larger relative movement between the contact areas allowing for the pivot to experience rolling motion with its lower friction at least more often. This concept can be expanded by alternating between two tracks to avoid the typically much higher static friction. Functionally, individual preloads in line with vertical ball bearing pairs may alleviate race deflection in order to avoid center shifting and/or bias variations.

Figure 30:
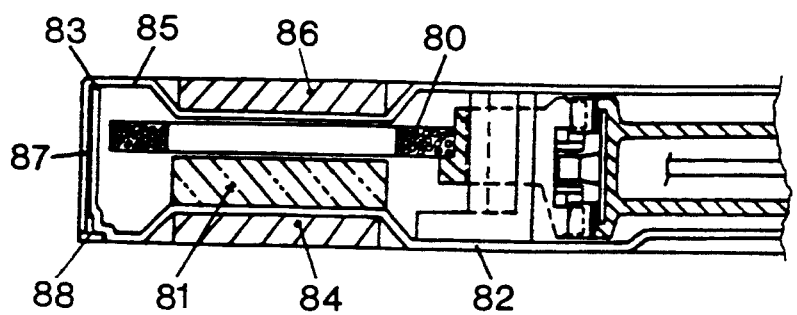
FIG. 30 shows a flat coil with deck/cover/yokes and additional yokes.

FIG. 30 shows a conventional flat coil 80, magnet 81, deck means 82 which may be of ferro-magnetic sheet-metal, deck/cover and perhaps partial contact points 83, additional integrable deck yoke means 84, cover 85 with additional integrable cover yoke means 86 and cover overlap/reinforcement 87 interfacing with a seal means 88 which may be permanently attached to the deck means or vice versa. The deck/cover means also serve as yoke and spacer means eliminating parts and tolerances. In certain applications, additional yokes 84, 86 may be optional. The deck/cover may be flat and 84, 86 may be affixed on opposite sides by means including resistance welding. The term deck shall also include an insert, cover and/or housing, perhaps combining deck and cover where appropriate.

Figure 31:
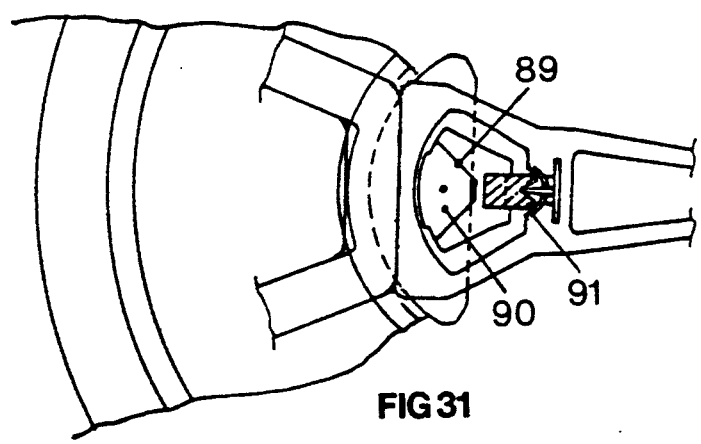
FIG. 31 is a top view of FIG. 30 showing separation of deck pivot structure means.

FIG. 31 shows a top view of FIG. 30. The contour 89 denotes two separate elements for a deck pivot structure wherein structure 90 can be inserted vertically in order to be joined with a fixed deck pivot structure portion. Also shown is a cast-in elongated pin structure means including preload permeable loop closure means 91.

Figure 32:
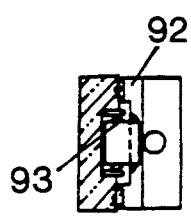
FIG. 32 shows a pivot arrangement with integral elongated pin means.

FIG. 32 shows such pin structure as an integrable blade type configuration, while contact feature 93 provides for rotatable, vertical registration. The upper and lower flat portions may be combined into one integral insert, see also FIG. 75.

Figure 33:
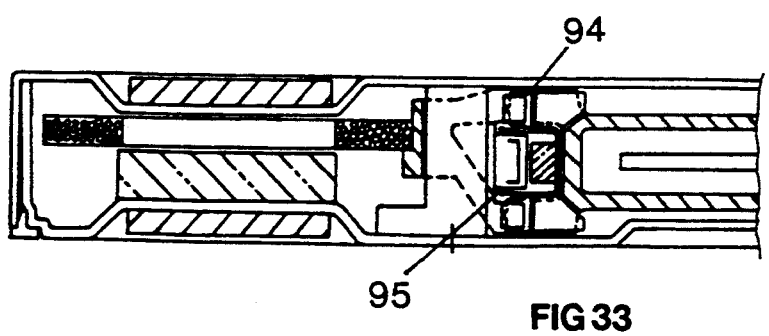
FIG. 33 shows individual elongated pin means.

FIG. 33 shows a pin configuration with individual blades 94 and vertical registration 95 which may consist of either at least one spring or fixed member. The individual blade parts may be combined into one structure.

Figure 34:
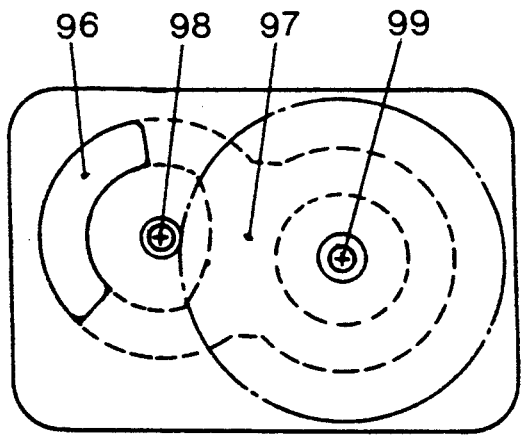
FIG. 34 shows a top of integrable yoke and deck reinforcement means.

FIG. 34 shows a top view of a flat/horizontal coil type unit with a yoke insert 96 which may be extended into a structural loop means 97 to include the spindle for a larger moment of inertia of the deck/cover configuration.

In certain applications, no screws or similar on the periphery for deck/cover/seal are required. The pivot screw or screws 98 and spindle 99 facilitate said larger moment of inertia besides joining deck/yoke and cover. A slight bend-down of the cover will assure proper seating of the beforementioned contact points/lines 83. Certain configurations may not allow and/or require said additional yokes and/or deck reinforcements. An additional flux path over the outer periphery may aid the yoke function.

Figure 35:
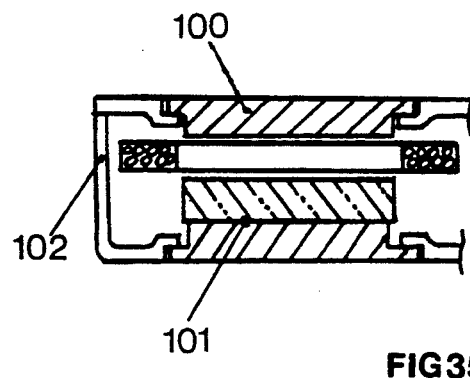
FIG. 35 shows integrable yoke means with non-ferromagnetic deck/cover/housing means.

FIG. 35 shows an implementation of yoke means 100 into a cover and yoke/magnet means 101 into a deck. The deck/cover means are perhaps not ferro-magnetic and may be of aluminum, ceramics or similar including sheet-metal and/or casting. The yoke means may also be cast-in, swaged, glued, welded, press-fitted or the like. Deliberate high spots may be coined to tolerance. The deck/cover means provide also spacer means for the yoke means in order to control a minimal air gap.

Figure 36:
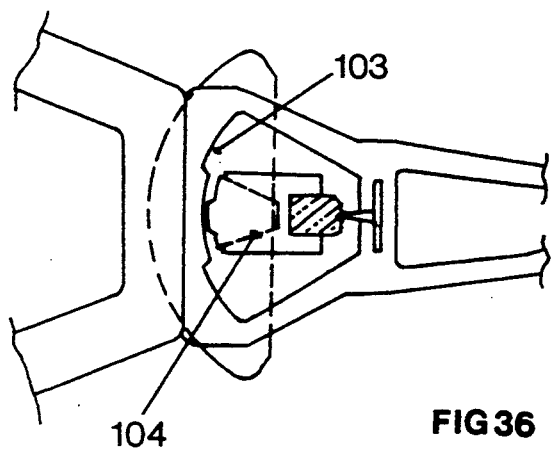
FIG. 36 shows assembly provision in vertical direction.

FIG. 36 shows an arrangement with an assembly clearance 103 and optional separation 104. The arm assembly is swung beyond a removed stop for assembly insertion. Where the deck is a bowl, clearance and/or a cut-out in the side wall has to be provided.

Figure 37:
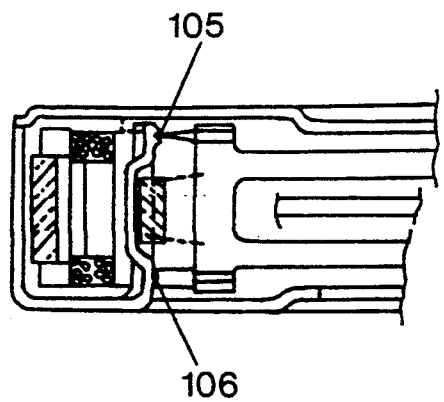
FIG. 37 shows integral sheet-metal deck pivot structure/yoke/cup means.

FIGS. 37/38 show an individual deck pivot structure 107 stamped/coined out of sheet-metal deck serving both inner yoke and here integral cups 105/106 functions.

Figure 38:
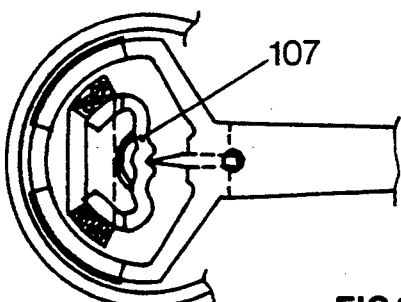
FIG. 38 is a top view of FIG. 37.

FIG. 38 shows a top view of FIG. 37.

Figure 39:
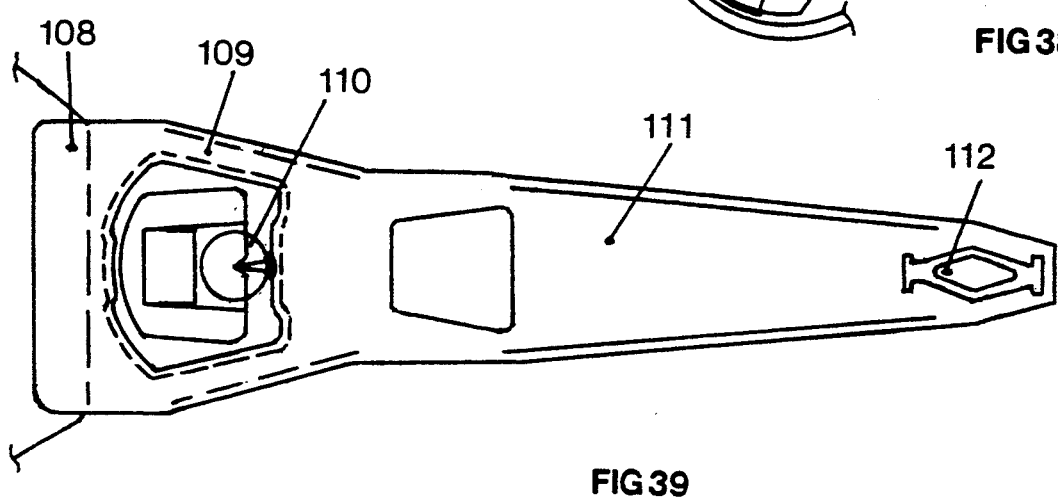
FIG. 39 shows an integral structure including head, flexure, arm extension and voice coil interface.

Although applicable to other configurations, perhaps typically here the cup means, and possibly also the pin means may need surface augmentation to achieve the required wear characteristics and/or low friction. This surface augmentation may include plating like hard chrome/nickel, diamondizing, nitriding, case hardening, bonding, catalytic surface conversion (Surface Conversion Technologies), NiBron R-68-72 (Pure Coatings Inc.), besides many others. FIG. 39 shows an integral arm structure including voice coil interface 108, arm extension 109, pivot interface 110, flexure 111 and head means 112. One or more may be combined for a unit.

Figure 40:
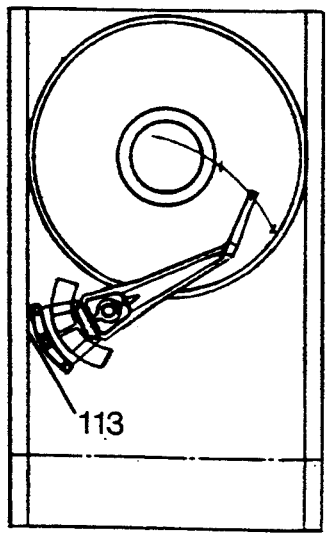
FIG. 40 shows an integration of a 5 milli-meter high memory card.

FIG. 40 shows a top view of a 5 milli-meter high memory card integration with the instant invention. The actuator could also be placed on the opposite side of the disk or both, perhaps for structural and/or assembly reasons.

Figure 41:
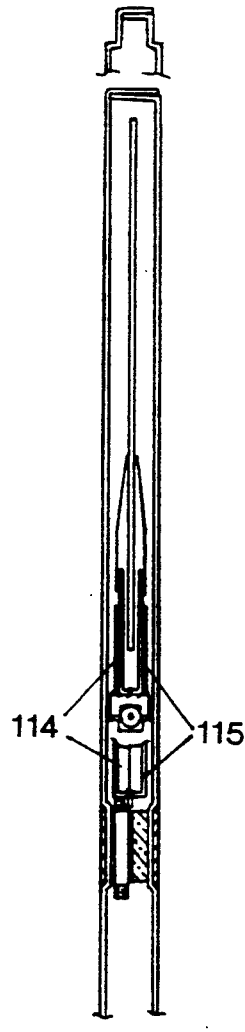
FIG. 41 shows a cross-section of a side view of FIG. 40.

FIG. 41 shows an enlarged side view of FIG. 40 also showing almost symmetrical and joined sheet-metal structures 114 and 115 comprising the arms structure.

A moving magnet version may utilize two voice coils to aid heat-transfer to deck/cover and avoidance of bias forces.

Figure 42:
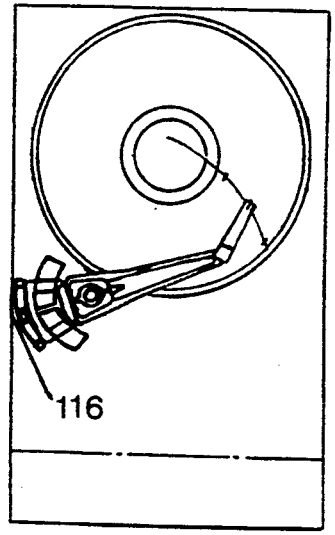
FIG. 42 shows an integration into a 3.3 milli-meter high memory card.

FIG. 42 shows a top view of a 3.3 milli-meter high memory card integration. Since the lower profile mandates a lower height for the voice coil mover, the mover is placed closer to the side allowing more space for the placement of electronic components. In certain applications, perhaps including multiple actuators per disk, the pivot may be located over the disk.

Figure 44:
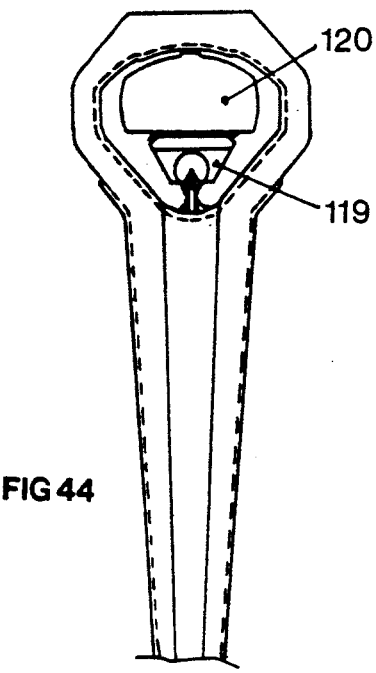
FIG. 44 shows arm structure and insertable pin/cup arrangement.
Figure 43:
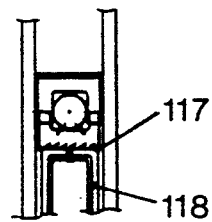
FIG. 43 shows a side view of FIG. 44.

FIG. 43 shows a side view of FIG. 44 showing an arrangement perhaps for a 3.3 milli-meter version and abutment of pin/blade structure 117 to arm structure 118.

FIG. 44 is a top view of FIG. 43 showing a cup insert 119 which can be aligned for height in reference to the disk means and also spherically for parallelism of pivot and spindle axes and perhaps X-, Y- coordinates before being permanently affixed to deck pivot structure means 120. The deck pivot structure may be integrated or be an integral portion of a deck/cover means.

Figure 45:
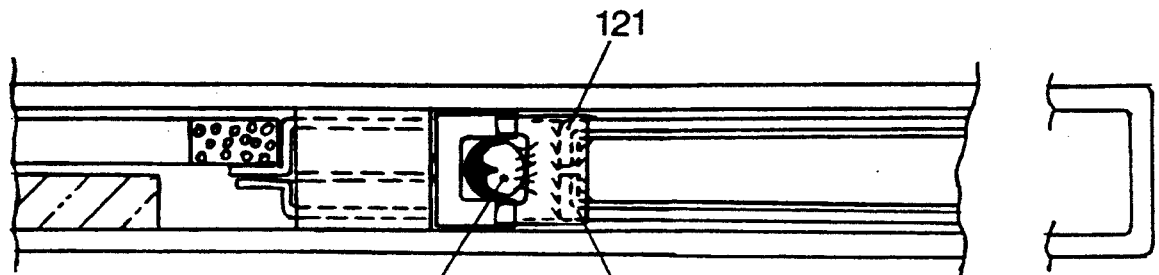
FIG. 45 shows an expanded side view for a 3.3 milli-meter memory card of FIG. 46.

FIG. 45/46 are similar to FIGS. 43/44. Here, the pins structure is inserted into slots 121/122 before being permanently attached to the arms structure by joining means including welding such as laser, ultra-sonic, resistance and brazing and/or staking or similar.

The ball means or similar including perhaps a thin cylinder with larger radius ends provides for vertical registration and more compactness. When commercially practical, cold rolled gamma titanium alumide or other light-weight and suitable materials for the arm structure, which may include voice coil, stops and pivot interfaces or be an integral part, and/or aluminum wire and/or thick-film technology for the voice coil, as examples, may be used for low mass/inertia considerations. Particularly for smaller drives, overall weight may be in the order of a gram or less exerting minimal Hertzian stress, friction and wear at contact. Also, if the mass and head pair preloads are balanced, no bias is exerted on the preload of the pivot.

Figure 47:
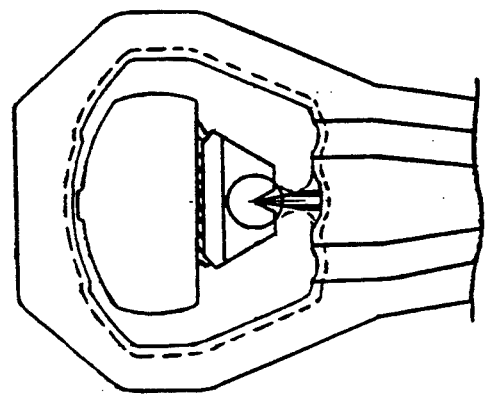
FIG. 47 shows enlarged assembly/inspection clearance.

FIG. 47 shows a relatively large opening providing access for a cup structure insertion/inspection tool.

Figure 48:
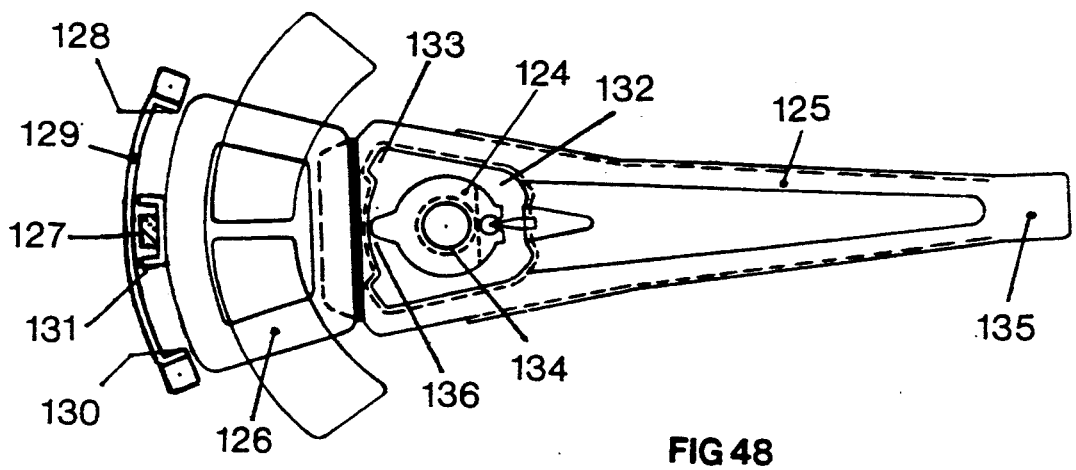
FIG. 48 shows a top view of an integral deck pivot and cup structure and preload/stop arrangement.

FIG. 48 shows a top view of a configuration including integral deck pivot and cup structure 124, arms structure 125, voice coil mover 126 and integration of preload magnet 127, stops 128, possibly permeable loop for preload and/or mover structure 129 and/or stop/parking latch 130. The parking latch may be facilitated by bulk distribution of the permeable interface structure 129. A bulk distribution may also provide a small bias as emergency retract to move the arm structure to said parking position if the power supply to the voice coil is shut off. The stop interface 131 may be of non-magnetic material, but not limited thereto, to isolate bias torque in the vicinity of the stationary stops 128.

A proper choice of materials and/or design components and/or air gap may alleviate bias variations.

The clearance 132 is provided for inspection purposes but could be reduced in order to achieve more compactness. The assembly clearance 133 is provided for insertion of arm structure 125 to integral deck pivot and cup structure 124. The tap 134 provides assembly means for attachment to deck/cover, however, other means including staking, riveting or similar are possible. The deck pivot structure may be integral with the deck. The stop interface 131 could be expanded into vertical dead-stop means as well in order to prevent arm extension to head gimbal interface 135, which could also include the gimbal, to touch the disk surface when excessive shock is imparted on the unit. For certain applications, the voice coil to yoke/magnet clearance may suffice.

As such, the above expansion into vertical dead-stop means could be placed at other locations preferably at larger radii from the pivot.

The above means can be provided should the dead-stop 136 due to its shorter distance to the pivot be insufficient.

Figure 49:
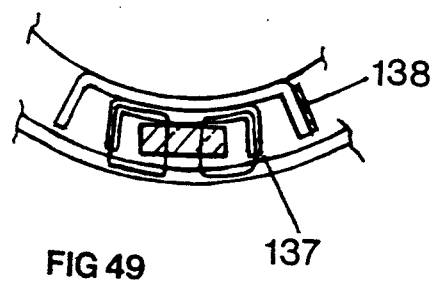
FIG. 49 shows details for preload and/or latch means.

FIG. 49 shows an isolation and/or shunting and loop closure means 137 for greater efficiency. The isolation may become necessary to avoid bias forces in the vicinity of the stops. A stop interface plate 138 is of thin permeable stock and/or low bulk for facilitating the parking/latching function. The low bulk assures a very low bias and force exertion essentially only at contact sufficient to latch a relatively low mass in place and also to keep the pull-out torque requirements low.

FIG. 50 shows ferro-magnetic loop structure 129 of FIG. 48 extended to include additional loop structure 139 for the voice coil mover. The flux lines 140 show about the direction of the flux while 141 denotes a conventional path which is perhaps aided by 140. The structure 129 of FIG. 48 may also provide such function, however, flux levels of preload and/or voice coil and/or latch have to be considered. This arrangement will tend to establish higher flux levels at larger radii for a higher force constant. The extension 139, which may also be a separate part, can also be extended to provide a separation wall 142 for the disk unit and electronics compartment for cleanliness purposes and also to provide structural reinforcement for the entire unit. The extension 139 will back up against the deck/cover also to assure essentially no air gap for the permeable loop. The pivot interface 143 as shown here interfaces with essentially two flat slanted surfaces and the cup consists of two parts.

FIG. 51 shows again an integral deck pivot/cup structure 144 with a removable dead-stop 145 which may be aided by some spring action in order to make definite contact in the vicinity of the stop interface 146. The distance 147 should be slightly longer than distance 148 to allow insertion of the arm structure.

FIG. 52 shows a portion of an integral pin/cup configuration which could also be integral with a deck and/or deck pivot structure which may be integrable. At least one pin may also be associated with such deck pivot structure while at least one cup is with the arm means. While pin 149 is elongated, round pin 150 interfaces with cup 151 which may be of the shape of a triangular based pyramid assuring essentially a three point contact. The sides of the pyramid may not necessarily be straight and may be limited to the vicinity of the vertex, however, longer than the dead-stop clearance. This pin/cup interface also provides registration along the pivot axis. The pins structure may also be an integral and/or integrable structure.

A substantially cone-shaped cup and an elongated pin, among others, will also provide vertical registration besides furnishing what shall be termed substantially one contact point for establishing the pivot axis. The pin and cup structures could be matched to accommodate for tolerances while establishing axis perpendicularity.

FIG. 53 shows an enlarged view into the pivot cup of FIG. 52. The orientation can be favored for reasons including structural and/or functional requirements such as friction.

FIG. 54 shows a slightly rounded pin-tip 152 to interface here with straight surfaces 153.

FIG. 55 shows a small flat pin-tip 154 to interface here again with straight surfaces 155. For particularly lightly loaded pin/cup arrangements, the line and/or perhaps essentially circular contact may provide better definition.

However, center-offsets, which are repeatable, have to be reconciled with the particular application.

Figure 56:
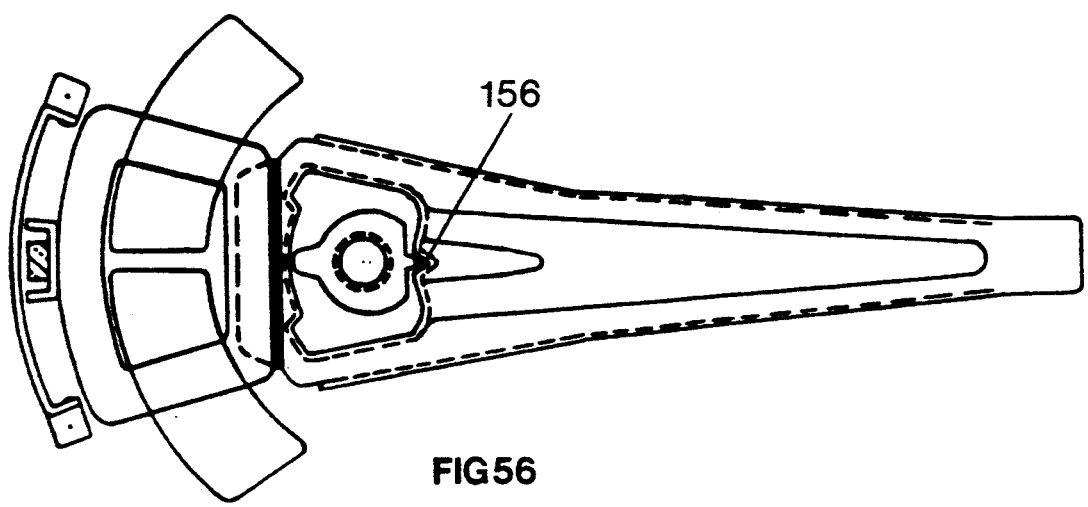
FIG. 56 shows pins integral with deck pivot structure and cups integral with arm structure.

FIG. 56 is similar to FIG. 48, except that the pins are integral with the deck pivot structure and the cups are here integral with the arms structure means as shown by interface 156. Both could be integrated as well.

Figure 57:
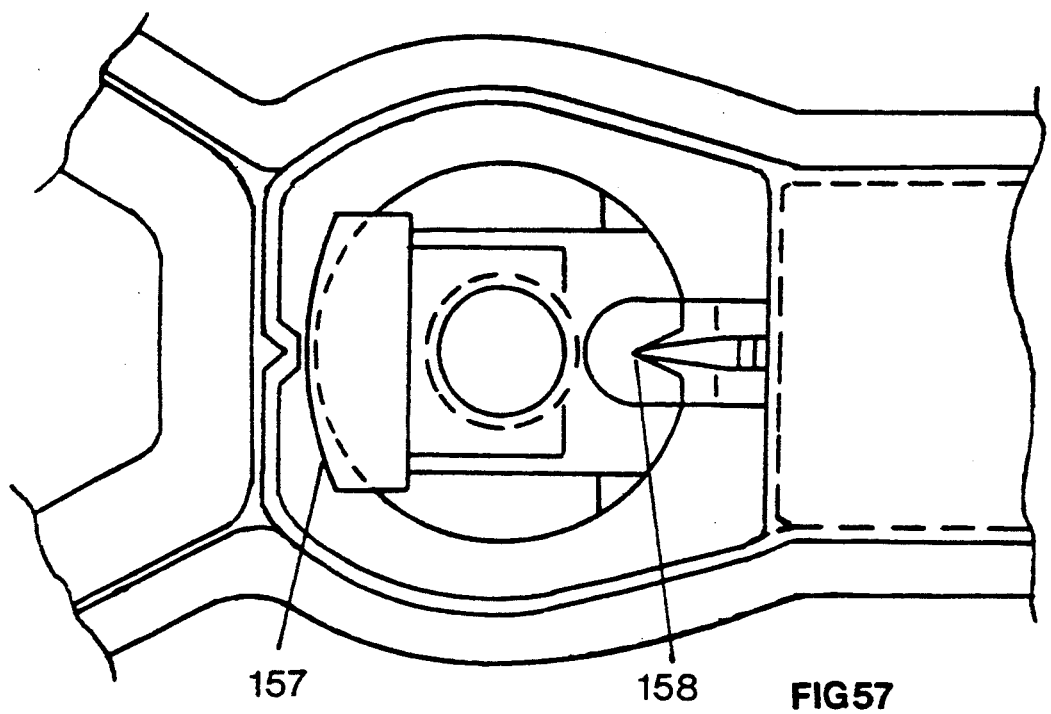
FIG. 57 shows a stationary preload and insertable dead-stop, perhaps with damping.

FIG. 57 shows an implementation with insertable dead-stop 157 and pin/cup interface 158.

Figure 46:
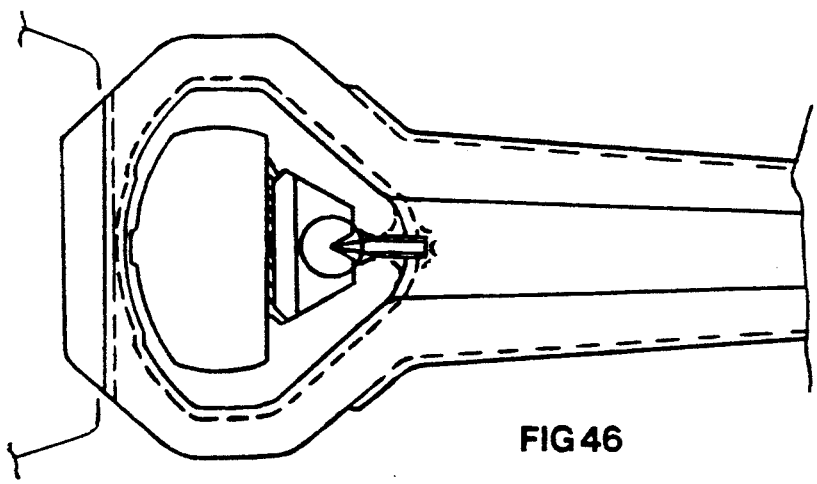
FIG. 46 emphasizes slot integration of pin means.
Figure 58:
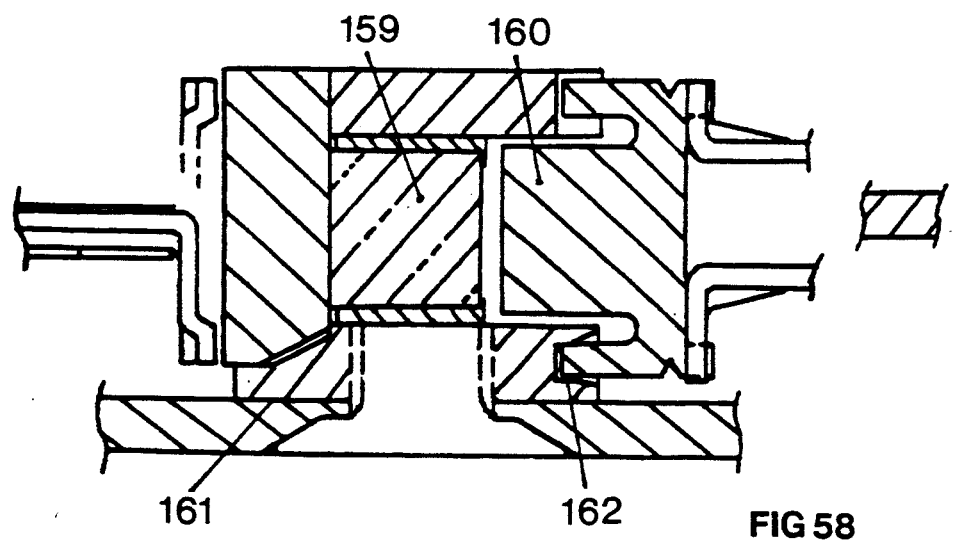
FIG. 58 shows a cross-sectional side view of FIG. 57.

FIG. 58 shows a stationary preload magnet 159 and a movable ferro-magnetic interface means or slug 160, essentially in the center of rotation for lowest inertia, which could be profiled to accommodate for bias torques due to windage, oil flow and similar. The mounting interface 161, here shown flat, could also be devised with spherical surfaces to allow alignment of the pivot axis. The spherical alignment feature could be used also with other structure means to avoid tight tolerances, see also FIGS. 44, 46 and 47 as examples. The deck pivot structure may also be optionally affixed to a cover on top. The vertical registration feature 162 provides minute clearance at small contact surfaces also for low friction. For reference, a width across the groove of a few thousands of an inch provided very low friction and/or bias for small drives. The width may also be lower, depending on application.

FIG. 59 shows another registration feature 163, perhaps precision headed before hardening.

FIG. 60 shows one implementation 164 of the above-mentioned spherical interface.

FIGS. 61 through 76 show pivot configurations especially interfacing with substantially round arm structure interfaces, but not limited thereto. Such arms structure 165 may be an integral structure, a cast-in/pressed-in/bonded-in or Similar sleeve, or a sleeve on which the arms and/or voice-coil/magnet/stop/latch structure is stacked upon. The preload magnet 166 is fixed to the deck pivot structure 168. Also shown are vertical registration points 167, one for each pin. A ferro-magnetic preload interface 169 or slug interfaces with magnet 166 to generate the pivot preload. The air gap 170 may be shorter on this side of the slug in order to generate higher attraction than on the other side. This may assure repetitive seating should the pins/cups interface 171 separate due to excessive shock. However, this flux imbalance may also lessen contact force by essentially reversal of air gaps to minimize effects including gravity.

FIG. 62 shows essentially a cross-sectional top view of FIG. 61. The magnet rounding 172 is optional. The pins/slug structure 173 is joined to a sleeve by means including laser-, E-beam- and/or TIG-(Tungsten Inert Gas) welding among many other processes and/or means for joining.

FIG. 63 is a cross-sectional side view of FIG. 65. The deck pivot structure cover 174 is optional.

FIG. 64 shows an optional deck pivot structure protrusion/projection 175 for mounting which is in the center of the pivots axis.

FIG. 65 shows a configuration wherein the magnet 177 and/or the stop structure 178 and the pins/sleeve structure are both removable from the deck pivot structure. The term removable shall also include insertable and/or integrable. The contours 179 and 180 allow access for such insertion/removal. The two deck pivot structure taps 176 allow also angular orientation for affixation to the deck.

FIG. 66 shows a pins/slug structure which allows a wider operating range. The slug 181 may be of highest ferro-magnetic properties to allow for more preload and/or air gap and/or compactness. The slug 181 is attached to the pins structure 182.

FIG. 67 shows a removable magnet/stop configuration with spring 183 exerting clamping force.

Figure 68:
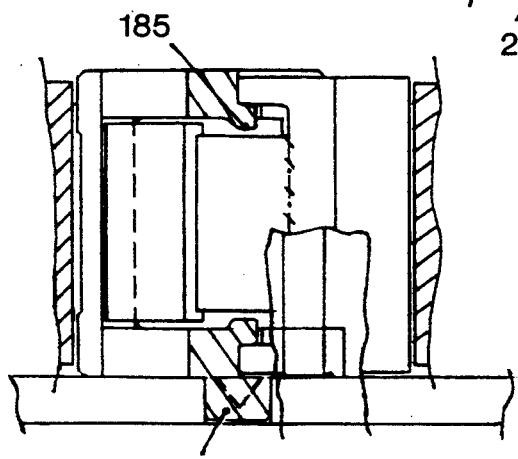
FIG. 68 shows a cross-sectional side view of FIG. 69.
Figure 69:
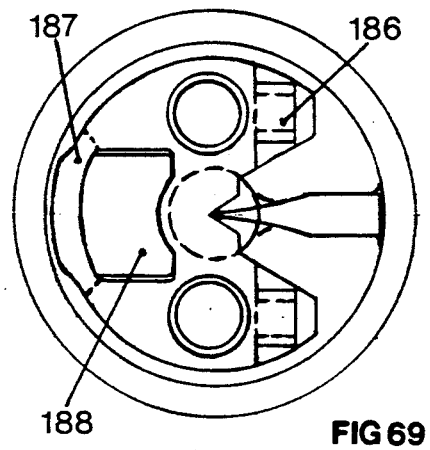
FIG. 69 shows a top view wherein the deck pivot structure is devised by operations which may include bending/machining/coining/drawing/stamping/fine-blanking among others.

FIG. 68 shows essentially a cross-sectional side view of FIG. 69. The optional protrusions/projections 185 may evolve by coining/drawing of the cups providing more strength for the vertical registration structures. The deck pivot structure projections 184 facilitate mounting to the deck structure.

FIG. 69 shows an embodiment manufactured by machining from a substrate, or bent/drawn/coined from sheet-metal or other substrates among others. While the vertical stop portion 187 may be coined/drawn, the upper and lower portions are bent in the horizontal direction. The columns 186 are also bent orthogonally and interface to the bottom portion of the deck pivot structure by means including swaging. A configuration may be devised wherein such swaging occurs at the stop portion. The openings 188 allow insertion of a preload magnet.

However, the openings also allow insertion of a back-up die for coining/drawing of the cups perhaps including the vertical registration features and also the mounting surface for the magnet.

Figure 70:
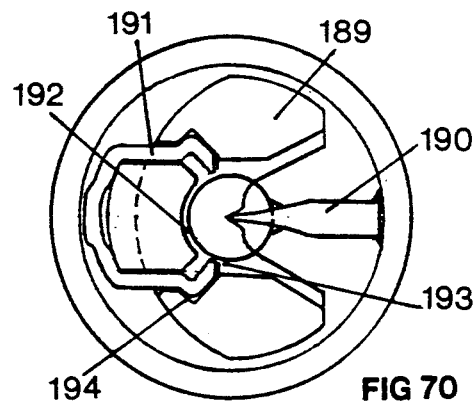
FIG. 70 shows a configuration also allowing the deck pivot structure to be without ferro-magnetic properties.

FIG. 70 shows an embodiment wherein the deck pivot structure 189 does not need to be of ferro-magnetic material in order to enhance the preload function by providing ferro-magnetic loop closure means. A spring structure 191, which besides accommodating dead-stop means and preload magnet, provides for a ferro-magnetic loop element. This loop element 191 is part of the magnetic flux path which also includes air gaps 192 and 193 and also the ferro-magnetic slug. The spring structure 191 seats on deck pivot structure interface 194 in order to provide definite registration for the magnets and stops. The pins structure 190 is here shown to be of metallic material interfacing with a metallic sleeve, but is not limited thereto. Material choices for deck pivot structure 189 may include aluminum, stainless steel, ceramics and other suitable materials or combinations thereof like alloying/mixing among others.

Figure 71:
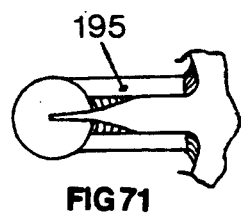
FIG. 71 shows a ferro-magnetic preload or slug interface also for materials without ferro-magnetic properties.

FIG. 71 shows an embodiment wherein the pins are an integral portion of the arms structure or sleeve, perhaps for uses including ceramics. The slug and its extensions 195 are of ferro-magnetic material which may include a permanent magnet and are bonded to the structure.

Figure 72:
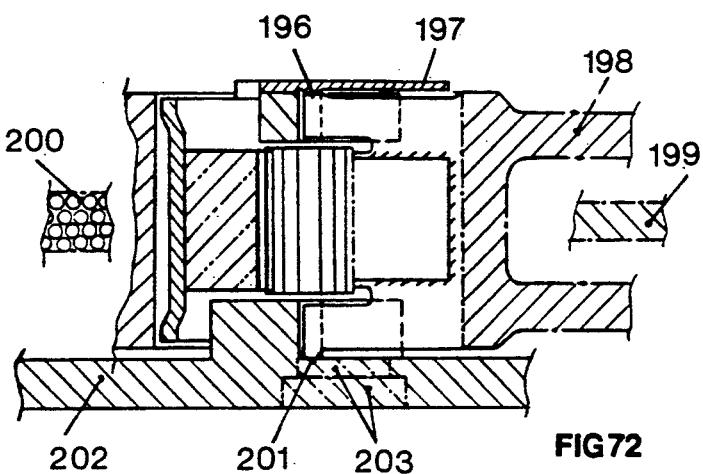
FIG. 72 shows essentially a cross-sectional side view of FIG. 70 including also non-ferrous materials including ceramics for example.

FIG. 72 shows essentially a cross-sectional side view of FIG. 70. Although not limited thereto, highlighted again is a scenario wherein the material choice may be ceramics including for example silicon carbide perhaps suspended in a matrix or titanite or a combination of alumina/zirconia possibly improving frequency characteristics of moving parts like arm structure besides providing for example hardness, and/or conductivity for the pivot interfaces. The contact surface 196 of a pivot cover together with contact interface 201 provides for registration along the pivot axis. Depending on the application, rotatable, vertical (i.e. in directions of the pivots axis), registration means may be either provided by a perhaps slight spring-force/dead-stop, or a zero clearance, see also FIGS. 52 through 55 and 77, or a minute deliberate clearance to establish most favorable operating characteristics. The extension 197 helps to prevent foreign particles to enter the pivot similar to a shield in ball bearings. Arms structure 198 is integral with the pins structure and also accommodates such other functional parts as voice-coil 200, stops and perhaps others. The disk 199 may be of the same material as well as the integral deck pivot structure and the deck 202. For certain applications, the location of the disk/voice-coil may be reversed, but not limited to any orientation. It will be very favorable from an operational standpoint and/or including thermal expansion/contraction that all such functional elements are of the same or at least similar material. One example may be .the application of gamma titanium alumide for both head/gimbal flexure and arm structure. A second vertical registration is established by contact interface 201. An optional opening 203 may initially be provided in order to provide access for a broach tool, perhaps with diamond particle inclusions, to possibly dress/redress the cup interface. After such operation, the opening would be closed by an insert. It is pointed out that matching of pins and cup interfaces is feasible. Particular batches may have about the same dimensional deviations. By way of example, should a cup axis be tilted, depending on direction either a wider or narrower pin-tip could correct in order to realign the pivot axis. Similar conditions also exist for a lateral misalignment. A measurement of a pivot axis tilt in reference to a disk surface could be accomplished by detecting a minimum of three locations (center and outermosts of range), perhaps on the sleeve. A measurement on the arm extension for larger radii would provide more sensitivity if needed.

Figure 73:
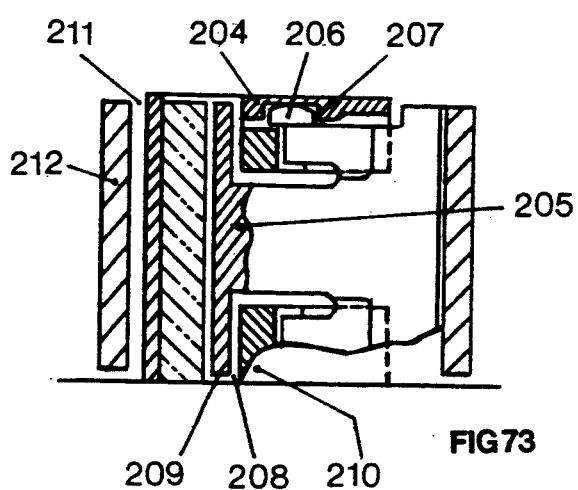
FIG. 73 shows registration means including cap/endplate, dead-stop and also extended ferro-magnetic preload also called slug means.
Figure 74:
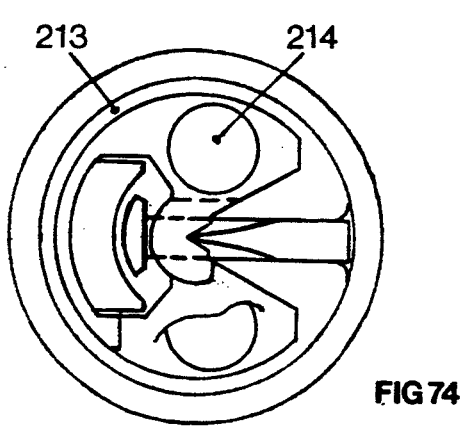
FIG. 74 shows lateral insertion of pins/slug before attachment to substantially round arms interface means.

FIG. 73 shows essentially a cross-sectional view of FIG. 74. A rotatable/vertical registration means shows a removable end-plate 204 which controls the confinement of movement of the pins/slug structure 205 along the pivots axis by interfacing with cap 206. The cap may also interface laterally with the end-plate 204 to provide dead-stop clearance 207. One cap, however, together with flux imbalance means and vertical, optionally nonmagnetic registration and/or dead-stop may suffice in certain scenarios. The cap 206 can also be extended and/or be an integral structure in a direction away from the pivot axis for reasons including structural requirements. A dead-stop clearance 208 may also be provided between the ferro-magnetic preload structure 209, also called slug, and the deck pivot structure 210. The configuration of cap and end-plate also allows a larger clearance 211 between the substantially round arms interface 212, perhaps a sleeve, and deck pivot structure 210. The slug 209 is extended and can also be inserted about laterally into the deck pivot structure 210, see also FIG. 74. The slug may be integral and/or integrable. The lower cup/pin to end-plate interface could perhaps be similar as shown on the top and/or be an integral portion of a deck means.

FIG. 74 is essentially a top view of FIG. 73 also highlighting lateral insertion capability of the pins/slug means arrangement 205. Also shown are potential mounting means 214. A low bias may also be achieved by means including saturation of the slug means.

Figure 75:
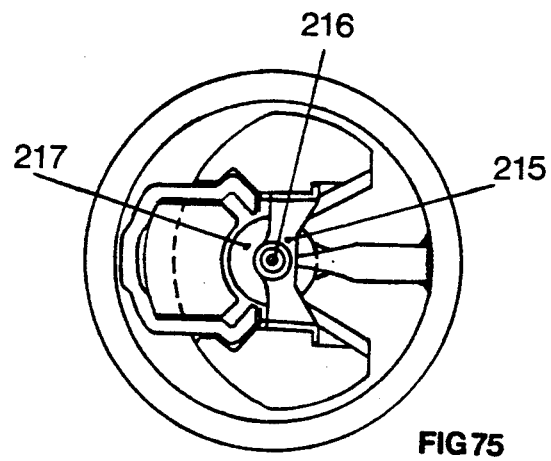
FIG. 75 shows insert means for rotatable registration means.

FIG. 75 shows an insert 215 as vertical registration means with a rounded projection 216 which may interface with a perhaps flat slug surface 217. The insert 215 may be expanded to include both slug surfaces. The insert 215 may rest on the slug surface which is tagged with "UV"-glue (ultra-violet) into position.

Figure 76:
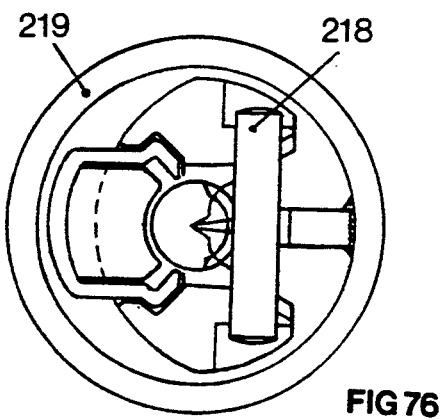
FIG. 76 shows pivot dead-stop means interfacing with deck pivot structure and slug means.

FIG. 76 shows a dead-stop arrangement here with a dowel pin 218, which interfaces with the slug to allow also more clearance in reference to a perhaps sleeve 219. This pin means 218 may be eccentric at the slug interface allowing adjustment. The relative movement is short which may aid to lessen the need for tight tolerances.

Figure 77:
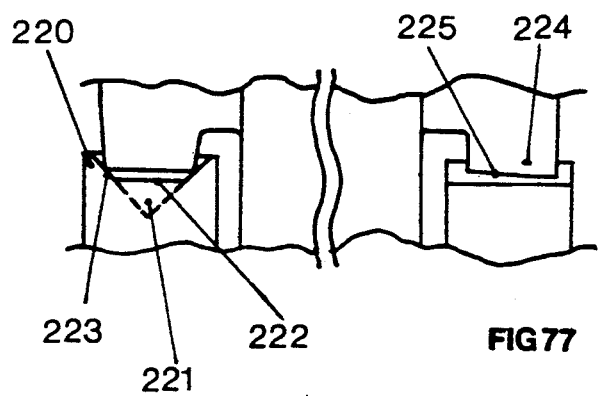
FIG. 77 shows elongated pin/cup arrangement for rotatable registration.

FIG. 77 shows a pin/cup arrangement with elongation in a direction of the pivot axis. The cup means 220 may range from a round, pyramid, perhaps diamond cone-shaped indentation 221 over a longitudinal cone shape along the pivots axis to an elongated groove 222 with slanted interfacing cup surfaces 223 for precision fitting including coining and the like allowing zero vertical registration clearance. This embodiment may also be expanded wherein elongated pins/cups seat properly in elongated grooves and the rotatable., vertical registration means either also or just barely touch.

The pin 224 shows a slight slant 225 allowing for longest distance between the contact points/surfaces of the individual pins. By contrast, pin 150 of FIGS. 52 through 55 is substantially round, but not limited thereto.

Figure 78:
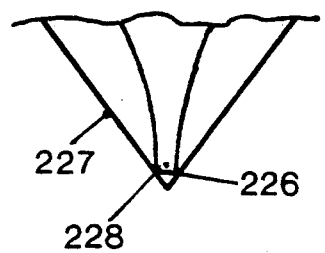
FIG. 78 shows side view of FIG. 77 emphasizing pin/cup interface.

FIG. 78 shows a side view along the pivot axis emphasizing sliding motion of the two contact points/lines 226 of each individual pin sliding against cup 227.

Also shown is a rounding 228 of the pin extension to possibly allow better contact definition and/or more strength. A substantial advantage besides the application of a less costly pivot implementation and/or perhaps improved functional aspects in the context of this invention is that many integral and/or integrable structure/elements serve at least one more function than conventional approaches do. The benefit may include elimination of structure/elements, tolerances, assembly/time, testing, space requirements, storage, shipping, general cost reduction and/or less expensive parts or similar.

It also has to be understood that although configurations with stationary cups are emphasized, at least one cup could be arranged on the movable arms structure as well, see also FIG. 56.

Besides showing some of the potential embodiments for the substantially two contact point, inherently partial turn pivot, or KNIFE EDGE PIVOT, integral/integrable structure/elements originating/interfacing with a deck of ferro-magnetic material which may be projected sheet-metal and/or powder-metallurgy and/or other forming processes and/or materials may be the following, but not limited thereto:

In a horizontal, also called flat, coil configuration, see also FIGS. 30/35:

Upper/lower and/or additional yokes also serving as spacer and/or mounting means (elimination of screws as example) for assembly of deck/cover, deck pivot structure, motor-ring, insert into housing and a housing all integral like a flat tube combining essentially deck-/cover/mounting/sealing and spacer means, and reinforcement loop for pivot/spindle.

In a vertical coil configuration, see also FIGS. 8,11 and 17:

Outer/inner (deck pivot structure) yokes, deck pivot structure, a tube like structure similar to the above, spacer and dead-stop means for partial turn mover.

Or originating/interfacing with a non-magnetic deck of material including aluminum, ceramic and/or cast, and sheet-metal besides others: Integrable yokes, see also FIGS. 34/35, integrable deck pivot structure perhaps including yoke, at least partial mounting and/or spacer means for horizontal/vertical coil configurations.

Or further originating/interfacing with deck pivot structure: Pin/cup, preload, dead-stop means. A cup/-magnet may be integral and/or a deck pivot structure be all magnet and bonded to the deck.

Some structure/elements could also at least partially be extended into the arms structure for an integral arrangement, see also FIGS. 39/56 for perhaps projected sheetmetal and FIG. 72, which also shows the deck pivot structure integral with a deck, for aluminum or ceramics configurations, but not limited thereto.

However, there are also such integral/integrable structure/elements which could be used with full-turn ball-bearing pivots.

Among them may be a deck insert as inner/outer (see FIG. 8), upper/lower/additional yoke, yoke/magnet including ferro-magnetic loop associated with deck pivot structure, and/or spacer and reinforcement loop for pivot/full-turn mover including ferro-magnetic loop, see also FIGS. 34/35.

It should be understood that a vast base of technology is in the public domain which could be utilized with the instant invention.

This patent application could not reasonably cover and mention all of those references, however, it should be understood that they should be included in the scope of this patent.

What is claimed is:

1. A disk drive for retrieval of data from or storage of data to media means rotated by a full turn mover, said disk drive comprising:
   arm structure means for supporting a head means, said head means movable about an axis of rotation relative to said media means, said arm structure means including:
   partial turn mover means for moving said head means;
   a member adjacent said partial turn mover means;
   wherein one of said partial turn mover means and said adjacent member has one or more projecting members, and the other of said partial turn mover means and said adjacent member has one or more recessed portions, said one or more projecting members and said one or more recessed portions interacting to form pivot means which defines said axis of rotation and which has an inherently limited range of rotation; and
   deck structure means for supporting said full turn mover, said partial turn mover means, and said adjacent member.

2. The disk drive of claim 1, wherein said members of said pivot means are integral and/or integrable with said arm structure and/or said deck structure.

3. The disk drive of claim 1, wherein plural projecting and/or recessed members are and/or portions utilized and are axially spaced.

4. The disk drive of claim 3, wherein the pivot means include said rotatable registration means.

5. The disk drive of claim 4, wherein said registration means confines relative movement between pivot structures along the pivot axis to substantially zero.

6. The disk drive of claim 5, wherein said confinement to zero movement includes a spring force and/or a dead-stop.

7. The disk drive of claim 5, wherein said confinement to zero includes interfacing of a pin means with slanted cup surface.

8. The disk drive of claim 5, wherein said confinement to zero includes interfacing with pyramid shaped surface.

9. The disk drive of claim 5, wherein said confinement includes insert means.

10. The disk drive of claim 5, wherein said confinement includes substantially round pin and/or cup means.

11. The disk drive of claim 5, wherein said confinement includes elongated pin and/or cup means.

12. The disk drive of claim 4, wherein said registration means includes placement about the pivot axis.

13. The disk drive of claim 4, wherein said registration means includes at least one individual pin and/or cup means.

14. The disk drive of claim 4, wherein said registration means includes lowering of a vertical contact force by flux imbalance means.

15. The disk drive of claim 4, wherein said registration means includes maintaining of a vertical contact force by flux imbalance means.

16. The disk drive of claim 1, wherein the arm pivot structure interfaces with a substantially round arm structure interface.

17. The disk drive of claim 1, having partial turn mover, wherein said partial turn mover has coil, ferro-magnetic loop and/or magnet means, said coil is shaped to interface with said ferro-magnetic loop and/or magnet means.

18. The disk drive of claim 17, said partial turn mover having ferro-magnetic loop means, said ferro-magnetic loop means establishing a higher flux level at larger radii for higher force exertion.

19. The disk drive of claim 1, having integral/integrable structure/elements, said structure/elements accommodating at least one additional function.

20. The disk drive of claim 1, wherein said deck structure includes ferro-magnetic material, integral/integrable structure/elements.

21. The disk drive of claim 20, wherein said structure/elements include projected sheet-metal and/or powder-metallurgy.

22. The disk drive of claim 21, said structure/elements for a horizontal coil configuration comprising of at least one of upper/lower/additional yoke, spacer, mounting means, deck pivot structure, portion of full turn mover, tube shaped deck and reinforcement loop for full-turn mover and pivot.

23. The disk drive of claim 21, said structure/elements for a vertical coil configuration comprising of at least one of outer/inner yoke, deck pivot structure, tube shaped deck, spacer and dead-stop means for partial turn mover.

24. The disk drive of claim 1, wherein said deck structure includes substantially non-magnetic means, integral/integrable structure/elements.

25. The disk drive of claim 24, said structure/elements comprising of at least one of integrable deck pivot structure, integrable yokes, at least partial mounting and/or spacer means.

26. The disk drive of claim 1, having deck pivot structure means, said deck pivot structure means integral/integrable structure/elements comprising of at least one of pin/cup, preload, preload magnet/slug, dead-stop and partial turn mover coil/magnet.

27. The disk drive of claim 1, wherein said axis is inherently full-turn integral/integrable structure/elements comprising of at least two of yoke/magnet, inner-/outer/upper/lower/additional yoke associated with deck pivot structure, spacer and, reinforcement loop for pivot and/or fall turn mover including ferro-magnetic loop.

28. A method for retrieval of data from or storage of data to media means rotated by a full turn mover, said method comprising:
providing a first pivot member for supporting arm structure means;
providing a second pivot member adjacent said first pivot member providing one of said first or second pivot members with cup means and providing the other of said first and second pivot members with pin means;
arranging said first and second pivot members to interact through a maximum of substantially two physical contact points to define pivot means having an axis of inherently limited rotation;
providing rotatable registration means to substantially confine relative motion between said first and second pivot members along said axis;
rotating said first pivot member to move head means relative to said media means;
retrieving data or storing data by activating said head means.

29. The method of claim 28, wherein a pivot member is integral and/or integrable with a deck structure and/or arm structure.

30. The method of claim 28, wherein said pivot includes roll-off and/or sliding motion.

31. The method of claim 28, wherein a deck pivot structure allows spherical alignment of arm pivot structure.

32. The method of claim 28, including a partial turn ball bearing pivot.

33. The method of claim 28, said pivot having preload magnet, dead-stop, pin and a round arms interface, wherein said magnet/dead-stop and/or pin/said round interface are removable.

34. The method of claim 28, said pivot having cup/-pin means, said cup/pin means allowing matching of individual pin and/or cup means for pivot axis alignment.

35. The method of claim 28, including bearing material based means.

36. The method of claim 35, wherein said bearing material includes metallic means.

37. The method of claim 36 wherein said metallic means include tool steel.

38. The method of claim 35, wherein said tool steel includes cutting tool steel.

39. The method of claim 35, wherein said bearing means include surface augmentation.

40. The method of claim 35, wherein said bearing means include ceramic material means.

41. The method of claim 40, wherein said ceramic means include silicon carbide and/or zirconia and/or alumina and/or titanite and/or carbide.

42. The method of claim 41, wherein said ceramic means include jewel bearing means.

43. The method of claim 28, having arms structure, wherein said arms structure is integral portion of pivot means.

44. The method of claim 28, having deck structure, wherein said deck structure is integral portion of pivot means.

45. The method of claim 28, wherein the pivot means includes preload means.

46. The method of claim 45, wherein the preload means includes magnetic means.

47. The method of claim 46, wherein said magnetic means includes magnet means, said magnet means includes being stationary with the deck pivot structure.

48. The method of claim 46, wherein said magnetic means includes magnetic loop closure means.

49. The method of claim 45, having partial turn mover, said partial turn mover includes preload and/or dead-stop means.

50. The method of claim 45, wherein said preload means is controllable.

51. The method of claim 50, wherein the preload means includes control of a bias torque.

52. The method of claim 50, wherein said bias torque includes emergency retract.

53. The method of claim 45, wherein a position dependent preload magnitude and/or direction substantially establishes a direction vertical to the instant contacting surfaces of the pin/cup means.

54. The method of claim 45, wherein said preload means having dead-stop means, said dead-stop means being an integral portion of said rotatable registration means.

55. The method of claim 45, wherein the preload means includes dead-stop means.

56. The method of claim 55, wherein the dead-stop includes a substantially round arm structure interface and deck pivot structure interface means.

57. The method of claim 55, wherein the dead-stop means includes deck pivot structure and/or slug means.

58. The method of claim 55, wherein the dead-stop means includes being removable and/or adjustable.

59. The method of claim 55, wherein the dead-stop means interfaces with a slug interface means.

60. The method of claim 28, wherein the pivot means include lubrication means.

61. The method of claim 60, wherein said lubrication means include striae.

62. A disk drive for retrieval of data from or storage of data to media means rotated by full turn mover, said disk drive comprising:
arm structure means for moving a head means about an axis of rotation relative to said media means, said arm structure means including;
pivot means including first pivot defining means and second pivot defining means which are spaced from each other along said axis to define through substantially two physical contact points said axis of rotation to be an axis of inherent partial rotation, at least one of said first and second pivot defining means including cup and pin means; and rotatable registration means to substantially confine relative motion between said cup and pin means along said axis to the micro-inch range.

63. Disk Drive for retrieval and/or storage of data on media rotated by full turn mover comprising:

pivot assembly means including two spaced apart pivot means including cup and pin means requiring a maximum of substantially two physical contact points forming an axis of inherent partial rotation and providing rotatable registration to restrict movement along said axis;

arm structure for supporting a head with said pivot means and a partial turn mover means;

deck structure for supporting said full turn mover, said pivot assembly means and said partial turn mover means.

64. The disk drive of claim 63, wherein said arm structure comprises magnet and/or coil means.

65. The disk drive of claim 63, wherein said pivot means consists of a cup means and a pin means, with both of said last mentioned means having substantially cone shaped interfaces.

66. The disk drive of claim 65, wherein the cup means comprises a cone angle which is larger than the cone angle of the pin means.

67. The disk drive of claim 65, wherein a second interface is elongated in the direction of a first interface.

68. The disk drive of claim 67, wherein said cup interface is longer than said pin interface.

69. The disk drive of claim 68, wherein a clearance is provided on both sides of said pin means with reference to said cup means.

70. The disk drive of claim 63, wherein said deck structure provides integral and/or integrable means for pivot structure means.

71. The disk drive of claim 63, wherein the deck structure provides integral and/or integrable means for a ferro-magnetic portion of a mover means.

72. The disk drive of claim 63, wherein the arm structure provides integral and/or integrable means for pivot structure means.

73. The disk drive of claim 72, wherein said arm structure provides integral and/or integrable means for portions of the partial turn mover means.

* * * * *